US008686950B2

(12) United States Patent
Yamamoto

(10) Patent No.: US 8,686,950 B2
(45) Date of Patent: Apr. 1, 2014

(54) SETTING OPERATION SUPPORT DEVICE FOR SUBSTRATE PROCESSING APPARATUS, SETTING OPERATION SUPPORT METHOD AND STORAGE MEDIUM HAVING PROGRAM STORED THEREIN

(75) Inventor: Masakazu Yamamoto, Iwate (JP)

(73) Assignee: Tokyo Electron Limited, Tokyo (JP)

( * ) Notice: Subject to any disclaimer, the term of this patent is extended or adjusted under 35 U.S.C. 154(b) by 1619 days.

(21) Appl. No.: 12/029,914

(22) Filed: Feb. 12, 2008

(65) Prior Publication Data

US 2008/0192023 A1 Aug. 14, 2008

(30) Foreign Application Priority Data

Feb. 13, 2007 (JP) .................................. 2007-032486

(51) Int. Cl.
*G06F 3/041* (2006.01)
(52) U.S. Cl.
USPC .......................................................... 345/173
(58) Field of Classification Search
None
See application file for complete search history.

(56) References Cited

U.S. PATENT DOCUMENTS

| 5,586,039 | A | * | 12/1996 | Hirsch et al. | ..................... | 700/95 |
| 5,859,638 | A | * | 1/1999 | Coleman et al. | .............. | 715/786 |
| 6,122,556 | A | * | 9/2000 | Tochiori et al. | .................. | 700/17 |
| 6,319,121 | B1 | * | 11/2001 | Yamada et al. | ..................... | 463/8 |
| 6,758,756 | B1 | * | 7/2004 | Horigami et al. | ............... | 463/43 |
| 6,764,401 | B1 | * | 7/2004 | Akatsuka | .......................... | 463/36 |
| 6,966,837 | B1 | * | 11/2005 | Best | ................................. | 463/33 |
| 2002/0183995 | A1 | * | 12/2002 | Veitch et al. | ...................... | 703/7 |
| 2005/0119050 | A1 | * | 6/2005 | Suzuki | ............................ | 463/36 |

FOREIGN PATENT DOCUMENTS

| JP | 8-227835 | 9/1996 |
| JP | 11-186118 | 7/1999 |
| JP | 2004-185103 | 7/2004 |
| JP | 2005-123249 | 5/2005 |
| JP | 2007-257476 | 10/2007 |

* cited by examiner

*Primary Examiner* — William Boddie
*Assistant Examiner* — Carolyn R Edwards
(74) *Attorney, Agent, or Firm* — Oblon, Spivak, McClelland, Maier & Neustadt, L.L.P.

(57) ABSTRACT

A setting operation support device includes an operation target object among components constituting a substrate processing apparatus, an operation setting of which can be selected, a simulator that simulates an operation of the operation target object, a touch-panel type operator operation display unit and a touch-panel type simulation operation display unit and a function setting button. The correlation between the operation target object and a screen related to its operation settings is stored in advance in a screen storage unit. As the function setting button is first depressed and then the operation target object is specified through a touch operation while a dynamic image of the operation target object is on display at the operator operation display unit, the setting screen correlated to the particular operation target object is searched at the screen storage unit and is brought up on display at the operator operation display unit.

15 Claims, 24 Drawing Sheets

| OPERATOR INTERFACE OBJECT SETTING RELATED SCREEN DATA TABLE | | |
|---|---|---|
| OPERATOR INTERFACE OBJECT | FUNCTION SETTING SCREEN | HELP SCREEN |
| OPERATOR ACCESS BUTTON | OPERATOR ACCESS BUTTON SETTING SCREEN | OPERATOR ACCESS BUTTON HELP SCREEN |
| ⋮ | ⋮ | ⋮ |

| OPERATION TARGET OBJECT SETTING RELATED SCREEN DATA TABLE | | |
|---|---|---|
| OPERATION TARGET OBJECT | FUNCTION SETTING SCREEN | HELP SCREEN |
| CARRIER TRANSFER | CARRIER TRANSFER OPERATION SETTING SCREEN | CARRIER TRANSFER HELP SCREEN |
| WAFER TRANSFER MECHANISM | WAFER TRANSFER OPERATION SETTING SCREEN | WAFER TRANSFER OPERATION HELP SCREEN |
| ⋮ | ⋮ | ⋮ |

| SETTING TARGET OBJECT SETTING RELATED SCREEN DATA TABLE |||
|---|---|---|
| SETTING TARGET OBJECT | FUNCTION SETTING SCREEN | HELP SCREEN |
| WAFER BOAT | WAFER BOAT SETTING SCREEN | WAFER BOAT HELP SCREEN |
| ⋮ | ⋮ | ⋮ |

SETTING OPERATION SUPPORT DEVICE FOR SUBSTRATE PROCESSING APPARATUS, SETTING OPERATION SUPPORT METHOD AND STORAGE MEDIUM HAVING PROGRAM STORED THEREIN

CROSS-REFERENCE TO RELATED APPLICATIONS

This document claims priority to Japanese Patent Application Number 2007-032486, filed on Feb. 13, 2007, the entire content of which are hereby incorporated by reference.

FIELD OF THE INVENTION

The present invention relates to a setting operation support device for a substrate processing apparatus, a setting operation support method and a storage medium having a program stored therein.

BACKGROUND OF THE INVENTION

Various settings that must be selected, and various operations that must be performed when engaging a substrate processing apparatus in operation are normally selected and performed by the operator by operating an operation unit of the substrate processing apparatus. The operation unit includes a touch-panel type operation display unit managed based upon a software program, a plurality of hardware buttons and the like, and these members may be disposed at, for instance, the front surface of the substrate processing apparatus.

Numerous screens such as setting screens and operation screens are brought up on display at the operation display units constituting part of the operation unit. These screens are sorted into a plurality of groups each corresponding to a specific classification, with screens in each group organized hierarchically. As a button displayed on a screen belonging to a given classification group is depressed, the screen in the next hierarchical layer in the group can be brought up on display. The operator selects a button corresponding to a setting to be selected or an operation to be performed in the screen on display at the operation display unit and touches the button. As the operator performs this touch operation repeatedly, he is able to switch the display from one screen to another until the desired screen is brought up on display so as to select the necessary setting or perform the necessary operation (see, for instance, Japanese Laid Open Patent Publication No. H08-227835). The substrate processing apparatus is engaged in operation under normal circumstances by first bringing up on display the relevant setting screens and selecting the various settings and then bringing up the relevant operation screen so as to engage the substrate processing apparatus under conditions corresponding to the selected settings.

An apparatus such as a substrate processing apparatus requires numerous settings of various types to be selected and, accordingly, the number of setting screens brought up on display at the operation display unit is extremely large. In other words, such an apparatus requires various types of setting operations, including setting operations performed via hardware buttons, setting operations performed to select processing conditions such as gas flow rates and pressures, setting operations performed to select settings for the substrate transfer system through which substrates such as semiconductor wafers are transferred and setting operations performed to enter the model numbers, the types and the like of the numerous parts constituting the apparatus, to be performed.

In addition, as a new function is added into a multifunction substrate processing apparatus, a setting screen in which the new function is set is created, resulting in a greater number of setting screens. Since such new setting screens are sequentially added to an existing hierarchical layer in the related screen group or are added to a newly created deeper hierarchical layer, the number of screens in each layer and the number of hierarchical layers are becoming increasingly large.

A problem thus arises in that when there are a large number of screen hierarchical layers, it becomes more time-consuming and labor-intensive for the operator to reach the desired setting screen through screen operations. In addition, depending upon how the screens are sorted, a setting screen for a given target object may be included in a hierarchical layer in another screen group. Under such circumstances, it is bound to be an extremely complicated and time-consuming process to find the desired setting screen. There is an added concern that needs to be addressed when the operation screens and the setting screens are sorted into separate screen groups in that if it becomes necessary to adjust the setting for an operation target while the apparatus is engaged in operation after performing a setting operation in the setting screens and then switching to the operation screen, the operator will have to perform a complicated setting operation by first reverting to the setting screens and sequentially switching the setting screens until the desired setting item for the operation target is brought up on display for the setting adjustment.

The operator thus needs to have certain know-how and experience with regard to the various setting screens and the setting operations performed to select specific settings in order to be able to bring up on display the desired setting screen quickly. In other words, there may be operators who do not know how to locate a specific function or how to locate the corresponding setting item that must be selected in order to set a given function.

SUMMARY OF THE INVENTION

An object of the present invention, having been completed by addressing the issues discussed above, is to provide a setting operation support device and the like, with which the desired screen can be brought up on display immediately through a simple operation and thus, setting operations can be performed to select settings for a substrate processing apparatus with better ease and convenience.

The object described above is achieved in an aspect of the present invention by providing a setting operation support device that supports a setting operation performed to select a setting in a substrate processing apparatus, comprising an operator interface object via which the substrate processing apparatus is operated, a touch-panel type operation display unit at which at least a screen related to settings for the operating member can be brought up on display, a setting storage unit in which contents of a setting selected in the screen related to the settings for the operator interface object are stored, a setting support button, a screen storage unit in which operator interface object setting-related screen information indicating a predetermined correlation between the operating member and the screen related to the settings for the operator interface object is stored and a control unit that engages the operation display unit to display the screen correlated to the operator interface object searched from the screen storage unit in response to an operation of the operator interface object following a depression of the setting support button.

The operator interface object may be, for instance, an operation button displayed at the operation display unit or an operation button provided independently of the operation display unit. The setting support button may be a function setting button displayed at the operation display unit or a function setting button provided independently of the operation display unit and the screen related to the settings for the operator interface object may be, for instance, a function setting screen.

According to the present invention described above, the operator only needs to perform an operation via the operator interface object after depressing the setting support button to immediately and automatically bring up on display the screen related to the settings for the operator interface object at the operation display unit. As a result, the length of time required for the setting operation can be greatly reduced. After depressing the setting support button, the operator simply needs to perform an operation via the operator interface object to promptly bring up on display the screen related to the settings for the operator interface object even if he does not have any know-how or experience with regard to setting operations, e.g., even if he does not know where the desired setting screen is located. Furthermore, since the screen related to the settings for the operator interface object is brought up on display automatically, the function to be set can be located with ease. Since the ultimate target setting screen does not need to be located by sequentially switching setting screens as in the related art, the setting operation can be performed with greater ease and convenience.

The setting support button may include the function setting button and a function description button. In such a case, operator interface object setting-related screen information indicating predetermined correlation of a specific function setting screen and a specific function description screen to the particular operator interface object may be stored in the screen storage unit and as an operation is performed via the operator interface object following a depression of the function setting button, the control unit may search for the function setting screen correlated to the operator interface object at the screen storage unit and engage the operation display unit to display the function setting screen resulting from the search, In addition, as an operation is performed via the operator interface object following a depression of the function description button, the control unit may search for the function description screen correlated to the operator interface object at the screen storage unit and engage the operation display unit to display the function description screen related to the operating member resulting from the search.

In this case, the operator simply needs to perform an operation via the operator interface object after depressing the function description button to immediately and automatically bring up on display the function description screen corresponding to the operator interface object at the operation display unit. Since the need for searching extensively for the function description screen is eliminated and the setting operation can be performed by checking the description brought up on display, the reliability of the setting operation is improved.

The setting operation support device may further comprise a simulator capable of executing a simulation for an operation target object engaged in operation as the operator interface object is operated. In such a case, as a setting operation is performed in a screen brought up on display at the operation display unit, the control unit may store the contents of the selected setting into the setting storage unit, then engage the simulator in execution of a simulation corresponding to the setting contents stored in the setting storage unit for the operation target object engaged in operation in response to an operation of the operator interface object and bring up a simulation image on display at the operation display unit.

According to the present invention described above, immediately after the operator performs a setting operation in the screen on display at the operation display unit, the image of the simulation related to the operation executed at the setting selected through the setting operation can be brought up on display at the operation display unit, enabling the operator to promptly verify the operation that will be executed under conditions corresponding to the selected setting. This, in turn, ensures that the actual operation can be executed with a high level of reliability at the optimal settings having been selected. In addition, since the need to perform verification by actually engaging the substrate processing apparatus in operation to check the state of the operation executed at the selected setting is eliminated, better ease of operation is assured.

The object described above is also achieved in another aspect of the present invention by providing a setting operation support device that supports a setting operation performed to select a setting for a substrate processing apparatus, comprising an operation target object constituting part of the substrate processing apparatus for which an operation setting can be selected, a simulator that executes a simulation of an operation of the operation target object, a touch-panel type operation display unit at which at least a screen related to operation settings for the operation target object and a dynamic image of the simulation of the operation target object can be displayed, a setting storage unit in which details of a setting selected in the screen related to the operation settings for the operation target object are stored, a setting support button, a screen storage unit in which operation target object setting-related screen information indicating a predetermined correlation between the operation target object and the screen related to the operation settings for the operation target object is stored and a control unit that searches for the screen correlated to the operation target object at the screen storage unit and engages the operation display unit to display the screen resulting from the search as the operation target object for which simulation execution is underway is specified through a touch operation at the operation display unit following a depression of the setting support button while the dynamic image of the simulation of the operation target object is on display at the operation display unit.

The setting support button may be a function setting button displayed at the operation display unit or a function setting button provided independently of the operation display unit. The screen related to the operation settings for the operation target object may be a function setting screen related to operations of the particular operation target object.

According to the present invention described above, the operator only needs to follow a simple, visually intuitive procedure in which he depresses the setting support button and specifies the operation target object, a simulated operation of which is on display at the operation display unit by touching the operation target object on the screen in order to immediately and automatically bring up on display the screen related to the settings for the operation target object at the operation display unit. As a result, the length of time required for the setting operation can be greatly reduced. While the simulated operation f the target object is underway, the operator simply needs to depress the setting support button to promptly bring up on display the screen related to the settings for the operator interface object even if he does not have any know-how or experience with regard to setting operations, e.g., even if he does not know where the desired setting screen is located. Furthermore, since the screen related to the settings for the operator interface object is brought up on display automatically, the function to be set can be located with ease. Since the ultimate target setting screen does not need to be located by sequentially switching setting screens as in the related art, the setting operation can be performed with greater ease and convenience.

The setting support button may include the function setting button and a function description button. In such a case, operation target object setting-related screen information indicating a predetermined correlation of a specific function setting screen and a specific function description screen to the particular operation target object may be stored in the screen storage unit and as the operation target object for which the simulation execution is underway is specified following a depression of the function setting button while the image of the simulated operation of the operation target object is on display at the operation display unit, the control unit may search for the function setting screen correlated to the operation target object at the screen storage unit and engage the operation display unit to display the function setting screen resulting from the search. In addition, as the operation target object for which the simulation execution is underway is specified following a depression of the function description button while the image of the simulated operation of the operation target object is on display at the operation display unit, the control unit may search for the function description screen correlated to the operation target object at the screen storage unit and engage the operation display unit to display the function description screen resulting from the search.

According to the present invention described above, the operator only needs to perform an extremely simple and visually intuitive operational procedure of depressing the function description button and specifying the operation target object, a simulated operation of which is underway, by touching the operation target object on the screen at the operation display unit, to immediately and automatically bring up the function description screen for the operation target object at the operation display unit. Since the need for an extensive search for the function description screen is eliminated and the setting operation can be performed by checking the description brought up on display, the reliability of the setting operation is improved.

In addition, following a setting operation performed in the screen related to the operation settings for the operation target object, the control unit may store setting contents into the setting storage unit, then engage the simulator in execution of a simulation corresponding to the setting contents stored in the setting storage unit for the operation target object and bring up a simulation image on display at the operation display unit.

According to the present invention described above, immediately after the operator performs a setting operation in the screen on display at the operation display unit, an image of the simulation related to the operation executed at the setting selected through the setting operation can be brought up on display at the operation display unit, enabling the operator to promptly verify the operation that will be executed under conditions corresponding to the selected setting. This, in turn, ensures that the actual operation of the operation target object can be executed with a high level of reliability at the optimal settings having been selected. In addition, since the need to perform verification by actually engaging the substrate processing apparatus in operation to check the state of the operation executed at the selected setting is eliminated, better ease of operation is assured.

The object described above is also achieved in yet another aspect of the present invention by providing a setting operation support device that supports a setting operation performed to select a setting for a substrate processing apparatus, comprising a setting target object constituting part of the substrate processing apparatus, a specific setting of which can be selected, a simulator that executes a simulation display for the setting target object, a touch-panel type operation display unit at which at least a screen related to the settings for the setting target object and an image of the setting target object provided through the simulation can be displayed, a setting storage unit in which details of a setting selected in the screen related to the settings for the setting target object are stored, a setting support button, a screen storage unit in which setting target object setting-related screen information indicating a predetermined correlation between the setting target object and the screen related to the settings for the setting target object is stored and a control unit that searches for the screen correlated to the setting target object at the screen storage unit and engages the operation display unit to display the screen resulting from the search as the setting target object on display is specified through a touch operation at the operation display unit following a depression of the setting support button while the image of the setting target object provided through the simulation is on display at the operation display unit.

Setting support button may be a function setting button display at the operation display unit or a function setting button provided independently at the operation display unit. The screen related to the settings for the setting target object may be a function setting screen related to the particular setting target object.

According to the present invention described above, the operator only needs to follow a simple, visually intuitive procedure in which he depresses the setting support button and specifies the setting target object, a simulation image of which is on display at the operation display unit by touching the setting target object on the screen . . . and then in the third sentence in order to immediately and automatically bring up on display the screen related to the settings for the setting target object at the operation display unit. As a result, the length of time required for the setting operation can be greatly reduced. While the setting target object is on display through simulation, the operator simply needs to depress the setting support button to promptly bring up on display the screen related to the setting target object even if he does not have any know-how or experience with regard to setting operations, e.g., even if he does not know where the desired setting screen is located. Furthermore, since the screen related to the settings for the operator interface object is brought up on display automatically, the function to be set can be located with ease. Since the ultimate target setting screen does not need to be located by sequentially switching setting screens as in the related art, the setting operation can be performed with greater ease and convenience.

The setting support button may include the function setting button and a function description button. In such a case, setting target object setting-related screen information indicating a predetermined correlation of a specific function setting screen and a specific function description screen to the particular setting target object may be stored in the screen storage unit and as the setting target object the simulation image of which is on display is specified following a depression of the function setting button while the simulation image of the setting target object is on display at the operation display unit, the control unit may search for the function setting screen correlated to the setting target object at the screen storage unit and engage the operation display unit display the function setting screen resulting from the search. In addition, as the setting target object the simulation image of which is on display is specified following a depression of the function description button while the simulation image of the setting target object is on display at the operation display unit, the control unit may search for the function description screen correlated to the setting target object at the screen storage unit and engage the operation display unit to display the function description screen resulting from the search.

According to the present invention described above, the operator only needs to perform an extremely simple and visually intuitive operational procedure of depressing the function description button and specifying the setting target object, a simulation image of which is on display at the operation display unit, by touching the setting target object on the screen, to immediately and automatically bring up the function description screen for the setting target object at the operation display unit. Since the need for an extensive search for the function description screen is eliminated and the setting operation can be performed by checking the description brought up on display, the reliability of the setting operation is improved.

In addition, following a setting operation performed in the screen related to the settings for the setting target object, the control unit may store the contents of the selected setting into the setting storage unit, then engage the simulator in execution of a simulation corresponding to the setting contents stored in the setting storage unit for the setting target object and bring up an image of the simulation on display at the operation display unit.

According to the present invention described above, immediately after the operator performs a setting operation in the screen on display at the operation display unit, the image of the simulation related to the setting target object can be brought up on display at the operation display unit, enabling the operator to promptly verify the selected setting target object. As a result, the setting target object can be selected with a high level of reliability.

The object described above is also achieved in another aspect of the present invention by providing a setting operation support method for supporting a setting operation performed to select a setting in a substrate processing apparatus, comprising a process in which a decision is made as to whether or not a setting support button disposed at the substrate processing apparatus has been depressed, a process in which a decision is made, upon determining that the setting support button has been depressed, as to whether or not either an operation related to a target object for which a specific setting can be selected among components constituting the substrate processing apparatus or a specifying operation for specifying an operation target object or a setting target object in a simulation image on display at an operation display unit has been performed and a process in which upon determining that either operation has been performed, a screen correlated to the target object for which the operation has been performed is searched and brought up on display at the operation display unit based upon target object setting-related screen information indicating correlations between individual target objects and screens related to settings for the target object, which is stored in advance in a screen storage unit.

An object described above is further achieved in yet another aspect of the present invention by providing a computer readable storage medium having stored therein a program enabling a computer to execute steps of a setting operation support method for supporting a setting operation performed to select a setting for a substrate processing apparatus. The setting operation support method executed by the computer comprises a step in which a decision is made as to whether or not a setting support button disposed at the substrate processing apparatus has been depressed, a step in which a decision is made, upon determining that the setting support button has been depressed, as to whether or not either an operation related to a target object for which a specific setting can be selected among components constituting the substrate processing apparatus or a specifying operation for specifying an operation target object or a setting target object in a simulation image on display at an operation display unit has been performed and a step in which upon determining that either operation has been performed, a screen correlated to the target object for which the operation has been performed is searched and brought up on display at the operation display unit based upon target object setting-related screen information indicating correlations between individual target objects and screens related to settings for the target object, which is stored in advance in a screen storage unit.

According to the present invention, the operator selecting a specific setting for the substrate processing apparatus is able to immediately and automatically bring up on display the desired screen through a simple and intuitive operation. As a result, the setting operation can be executed with greater ease and convenience.

BRIEF DESCRIPTION OF THE DRAWINGS

FIG. 5A presents an example of an operator interface object setting-related screen data table that may be used in the embodiment;

FIG. 5B presents an example of an operation target object setting-related screen data table that may be used in the embodiment;

FIG. 5C presents an example of a setting target object setting-related screen data table that may be used in the embodiment;

DETAILED DESCRIPTION OF THE PREFERRED EMBODIMENT

Figure 1:
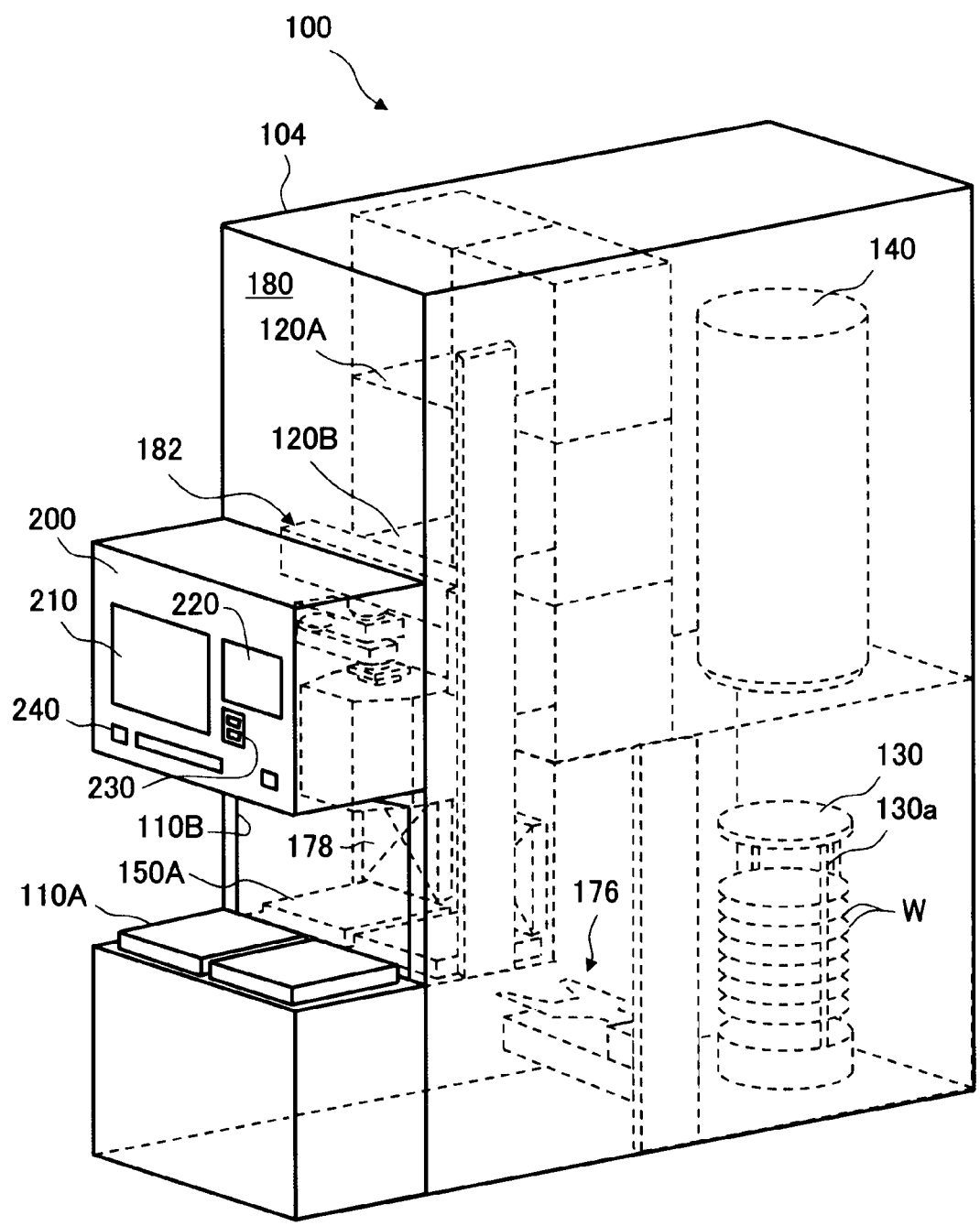
FIG. 1 is a perspective presenting a schematic external view of a heat treatment apparatus that may adopt the setting operation support device achieved in an embodiment of the present invention.

The following is a detailed explanation of a preferred embodiment of the present invention, given in reference to the attached drawings. It is to be noted that in the description and the drawings, the same reference numerals are assigned to components having substantially identical functions and structural features so as to preclude the necessity for a repeated explanation thereof.

Figure 2:
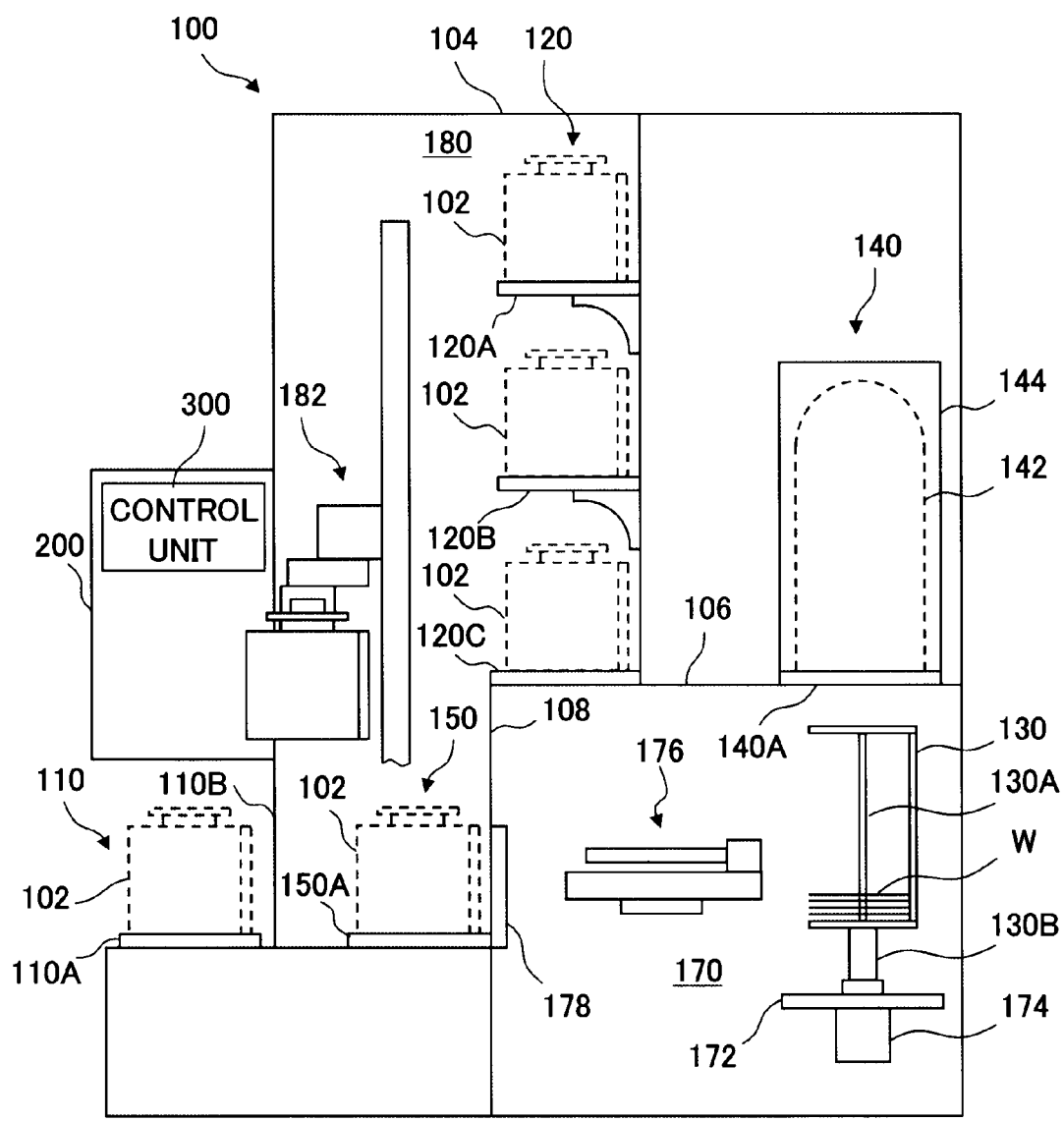
FIG. 2 is a longitudinal sectional view schematically illustrating the internal structure of the heat treatment apparatus in FIG. 1.

First, a substrate processing apparatus capable of functioning as the setting operation support device according to the present invention, as achieved in an embodiment, is explained in reference to drawings. In the embodiment described below, the present invention is adopted in a substrate processing apparatus which is an upright heat treatment apparatus. FIG. 1 is a perspective, presenting a schematic external view of the heat treatment apparatus, whereas FIG. 2 schematically illustrates the internal structure of the heat treatment apparatus in a longitudinal sectional view. In FIG. 1, the outlines of the components disposed inside the heat treatment apparatus are indicated by dotted lines.

As shown in FIGS. 1 and 2, the heat treatment apparatus 100 comprises a load port 110 through which a carrier 102 holding a plurality of (e.g., 25) processing target substrates such as semiconductor wafers W is loaded/unloaded into/out of a housing 104, a carrier stage 120 at which a plurality carriers 102 loaded in via the load port 110 are housed in storage, a heat treatment furnace 140 where numerous (e.g., 75) wafers, held over in a multi-tiered rack at a wafer boat (holding means) 130 undergo a specific type of heat treatment such as CVD processing, an FIMS port 150, at which a carrier 102 holding wafers W to be transferred over to the wafer boat 130 is placed and a control unit 300.

At each carrier 102, a plurality of wafers W, all held in a level state, can be stacked over multiple levels along the vertical direction with predetermined intervals within a container main body. It is a sealed carrier (FOUP: front opening unified pod) that includes a detachable lid (not shown) disposed at the front surface of the container main body. The carrier 102 is transported via, for instance, an OHT (overhead transmission device, an AGV or an RGV (automated guided vehicle), or a PGV (person guided vehicle).

The heat treatment furnace 140, disposed in the upper space at the rear inside the housing 104, includes a vertically elongated reaction tube 142 used as a processing container, with an open bottom end thereof functioning as a furnace throat 140A, and a heater 144 enclosing the reaction tube 142 and functioning as a heating mechanism capable of controlling the temperature of the atmosphere filling the reaction tube 142 through heat applications so as to sustain it within the range of, for instance, 300~1200° C. It is to be noted that the reaction tube 142 may be constituted of, for instance, quartz glass, assuring a high level of heat withstanding performance and good electrical insulation characteristics. In addition, the heater 144 may be constituted of, for instance, an ohmic heat generator.

A plurality of gas delivery pipes are connected to the reaction tube 142 at the heat treatment furnace 140, so as to deliver a processing gas and an inert purging gas into the reaction tube 142. A vacuum pump and a pressure control valve, via which the internal pressure at the reaction tube is adjusted, are connected to the reaction tube via a discharge pipe.

Inside the housing 104, a base plate 106 constituted of, for instance, stainless steel is disposed in a level orientation and the heat treatment furnace 140 is placed on the base plate 106. At the base plate 106, an opening (not shown) is formed at a position corresponding to the furnace throat 140A of the heat treatment furnace 140. The wafer boat 130 is loaded into the heat treatment furnace 140 through this opening and is then unloaded from the heat treatment furnace 140 through the opening.

In the space under the heat treatment furnace 140, a loading area 170, defined by the housing 104, the base plate 106 and a partition wall 108, is present. The wafer boat 130 to be loaded into the heat treatment furnace 140 waits in standby in the loading area 170. In addition, a lid member 172, which seals off the furnace throat 140A of the heat treatment furnace 140 from below, a rotating elevator mechanism 174, a shutter mechanism (not shown) that shields (shields from heat) the furnace throat 140A when the lid member 172 moves downward, a wafer transfer mechanism 176 that transfers wafers between the unloaded wafer boat 130 and the carrier 102 on the FIMS port 150, and a door mechanism 178 with which an opening (not shown) formed at the partition wall 108 can be sealed off, are disposed.

The wafer boat 130 is constituted with a boat main body 130A that supports wafers W with a large diameter, e.g., 300 mm, at a multi-staged rack with specific intervals along the vertical direction while holding them level and a leg portion 130B that supports the boat main body 130A. The wafer boat 130 may be constituted of, for instance, quartz glass.

The rotating elevator mechanism 174 is attached to the lid member 172. Thus, the lid member 172 moves up/down along the vertical direction via the rotating elevator mechanism so as to open or close the furnace throat 140A of the heat treatment furnace 140. A mechanism (not shown) that heats the furnace throat 140A or retains heat at the furnace throat 140A is mounted at the lid member 172.

The leg portion 130B at the wafer boat 130 is linked to the rotating shaft of the rotating elevator mechanism 174. This structure allows the wafer boat 130 to move up/down along the vertical direction by interlocking with the lid member 172 as well as engage in horizontal rotating motion. The wafer boat 130 is thus loaded into the heat treatment furnace 140 with its rotational angle along the horizontal direction adjusted.

A transfer/storage area 180, where the carriers 102, having been transferred therein are stored, is present at the front inside the housing 104. The transfer/storage area 180 and the loading area 170 are partitioned by the partition wall 108.

The FIMS port 150 is disposed in the lower space in the transfer/storage area 180. The FIMS port 150 includes a stage 150A on which a carrier 102 is placed, a locking mechanism (not shown) that locks the carrier 102 so as to place the front edge of the container main body of the carrier 102 in contact with the partition wall 108 and a lid opening/closing mechanism (not shown) that opens/closes the lid of the carrier 102. It is to be noted that the heat treatment apparatus may include two such FIMS ports 150 disposed parallel to each other.

The carrier stage 120 is disposed in the upper space at the rear of the transfer/storage area 180. The carrier stage 120 may include, for instance, first through third shelves 120A, 120B and 120C at each of which a carrier 102 can be placed for storage.

In the upper space at the front of the transfer/storage area 180, a carrier transfer 182 that carries carriers 102 and transfers them among the load port 110, the carrier stage 120 and the FIMS port 150 is disposed.

The load port 110 includes a stage 110A on which a carrier 102 is placed and an opening 110B through which the carrier 102 is carried into/out of the transfer/storage area 180. The carrier 102 may be carried into the load port 110 and carried out of the load port 110 via a floor transfer device or by an operator.

At the front wall above the load port 110, an operation unit 200 with which the operator performs various operations and selects functions of the heat treatment apparatus 100 is disposed. The operation unit 200 is connected to the control unit 300 that controls the various components of the heat treatment apparatus 100. Based upon operations performed through the operation unit 200, the control unit 300 executes various types of control for the heat treatment apparatus 100, including transfer control under which the carriers 102 are transferred, transfer control under which wafers W are transferred, heat treatment process control and simulation display control.

(Structural Example for the Control Unit)

Figure 3:
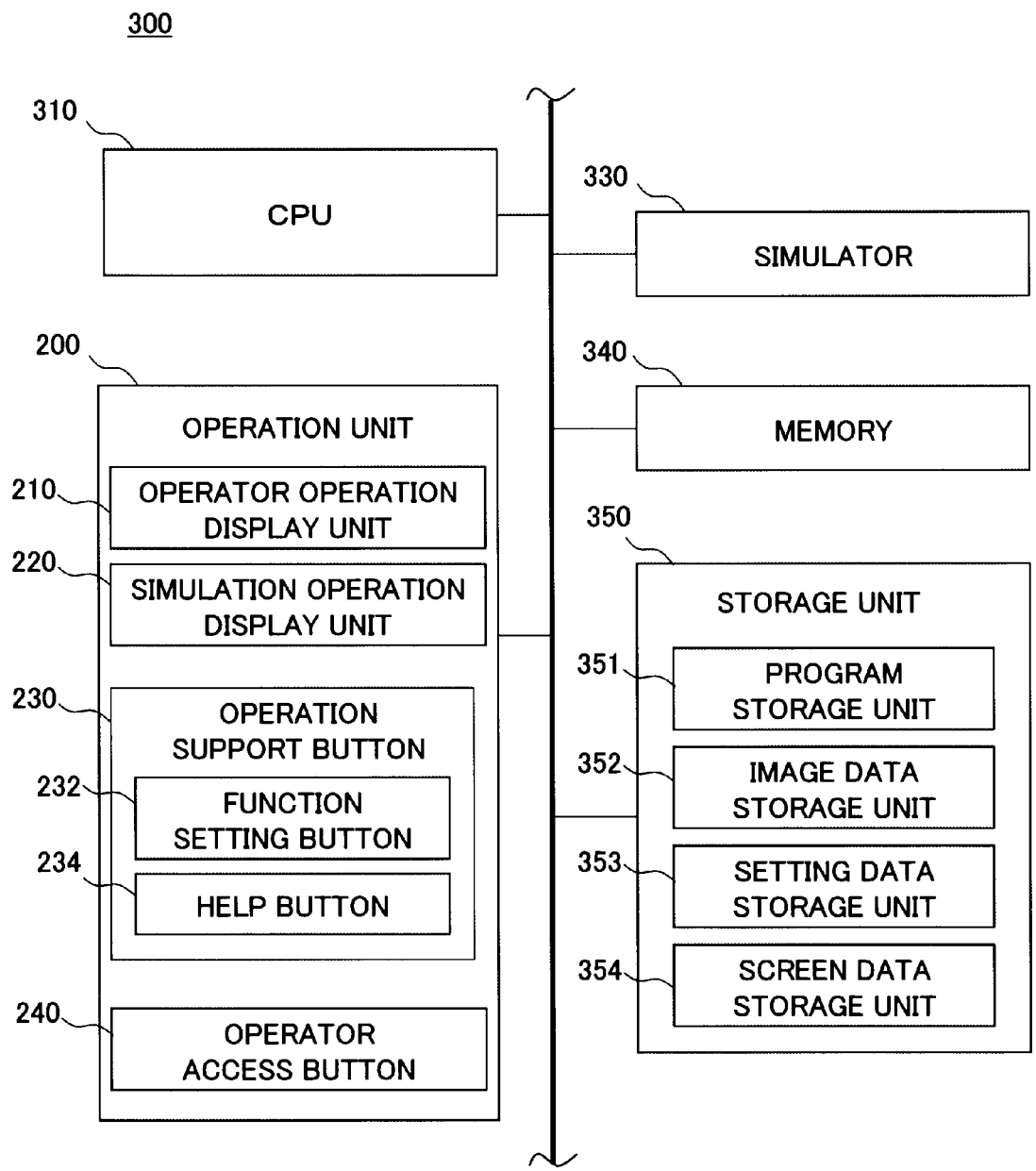
FIG. 3 is a block diagram schematically illustrating the structure of the control unit in FIG. 2.

In reference to a drawing, a structural example of the control unit 300 is described. The control unit 300 assumes a structure that enables the heat treatment apparatus 100 to function as a setting operation support device. FIG. 3 is a block diagram schematically illustrating a structure that may be adopted in the control unit. As shown in FIG. 3, the control unit 300 includes a CPU (central processing unit) 310 constituting the control unit main body. The CPU 310 is connected via a bus line such as a control bus or a data bus to a simulator 330 that executes simulations for various components of the heat processing apparatus 100 (e.g., a simulation of an operation of an operation target object, a simulation for setting a target object display and the like to be detailed later), a memory 340 used by the CPU 310 as it executes processing and a storage unit 350 in which data and the like needed in the processing executed by the CPU 310 are stored.

Figure 6:
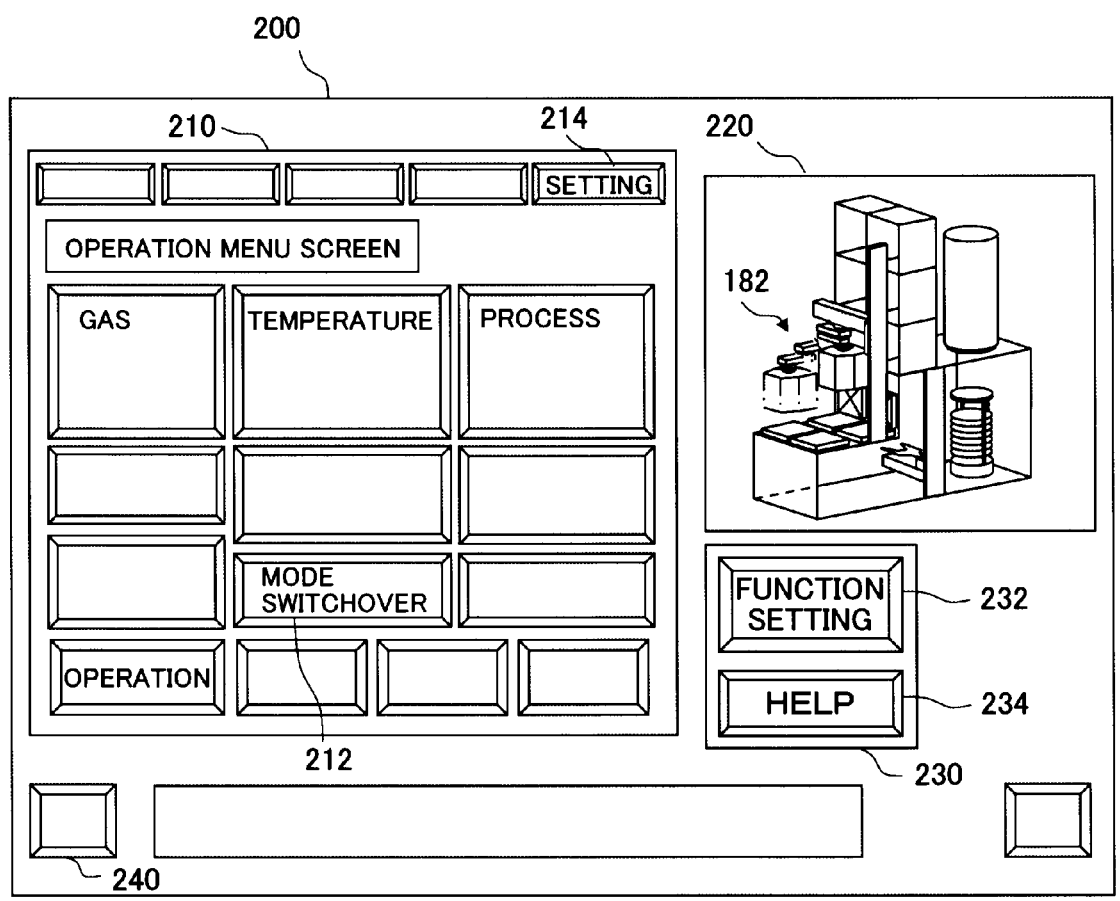
FIG. 6 presents a structural example that may be adopted in the operation unit in the embodiment.

The operation unit 200 includes operation display units such as an operator operation display unit 210 and a simulation operation display unit 220, as well as various operation buttons including operation support buttons 230 (a function setting button 232 and a function description button (HELP button) 234 in this example) and an operator access button (operator access switch) 240. As shown in FIGS. 1 and 6, the operation unit 200 may be disposed at, for instance, the front surface of the heat treatment apparatus 100.

The operator access button 240 is operated when a carrier 102 is to be set at the load port 110 by the operator. Either of the following two function settings may be selected at the operator access button 240 when manually setting the carrier 102. At the first function setting, the carrier 102 is set at the load port 110 after depressing the operator access button 240 and the operator access button 240 is pressed down again after the carrier is set allowing the heat treatment apparatus 100 to confirm that the carrier 102 has been set. At the second function setting, as the carrier 102 is set at the load port 110 after depressing the operator access button 240, the presence of the carrier 102 is automatically detected by the heat treatment apparatus 100 and thus the heat treatment apparatus automatically confirms that the carrier 102 has been set. Either of these settings may be selected in an operator access button setting screen such as that shown in FIG. 11.

The operation display units such as the operator operation display unit 210 and the simulation operation display unit 220 may each be constituted with a touch-panel type operation display panel. As shown in FIG. 6, various screens can be brought up on display in response to operator operations at the operator operation display unit 210. The screens that may be brought up on display at the operator operation display unit 210 include an operation screen displaying operation buttons and the like, a setting screen displaying setting buttons, setting entry fields and the like, a function description screen (HELP screen) displaying function description and the like and a status display screen displaying the states (temperature, pressure and the like) of the heat treatment apparatus. In addition, as a button displayed in a specific screen at the operator operation display unit 210 is depressed, the corresponding operation can be performed or the corresponding setting can be selected.

At the simulation operation display unit 220, a dynamic image of the simulation executed by the simulator 330 for a target object an operation setting of which can be selected (e.g., the carrier transfer 182 or the wafer transfer mechanism 176 in FIG. 2), among the components of the heat treatment apparatus 100, is displayed. In addition, a simulation image provided by the simulator 330 for a setting target object, the type or model number of which can be selected (e.g., the wafer boat 130 in FIG. 2) is brought up in a two-dimensional display or a three-dimensional (3-D) display at the simulation operation display unit. An operation target object or a setting target object can be specified by the operator by touching the display area where the image of the operation target object or the setting target object is displayed at the simulation operation display unit 220.

The storage unit 350 constituted with, for instance, a hard disk, includes a program storage unit 351, an image data storage unit 352, a setting data storage unit 353 and a screen data storage unit 354.

In the program storage unit 351, a program based upon which the various components of the heat treatment apparatus 100 are controlled, display programs based upon which the display at the operation display units 210 and 220 is controlled, a setting program based upon which settings for the individual components constituting the heat treatment apparatus 100 are selected, a simulation program based upon which a dynamic image display or a 3-D display of simulations of the operations of the various components of the heat treatment apparatus 100 are brought up, a program based upon which setting operation support processing to be detailed later is executed and the like are stored. These programs are read out and executed by the CPU 310 as needed.

In the image data storage unit 352, image data needed when the simulator 330 executes a simulation to display the operation of an operation target object as a two-dimensional dynamic image or a three-dimensional dynamic image and image data needed when the simulator executes a simulation to display a setting target object as a two-dimensional image or a three-dimensional image are stored.

In the setting data storage unit 353, setting data corresponding to settings selected through setting operations performed in individual setting screens are stored. The setting data include setting data corresponding to the settings to be selected as processing conditions (temperature, pressure and the like), and setting data indicating the sizes and types of components used in the heat treatment apparatus (e.g., the mass flow controller, which controls the gas flow rates of the gases supplied into the furnace, the boat elevator and the like).

Figure 4:
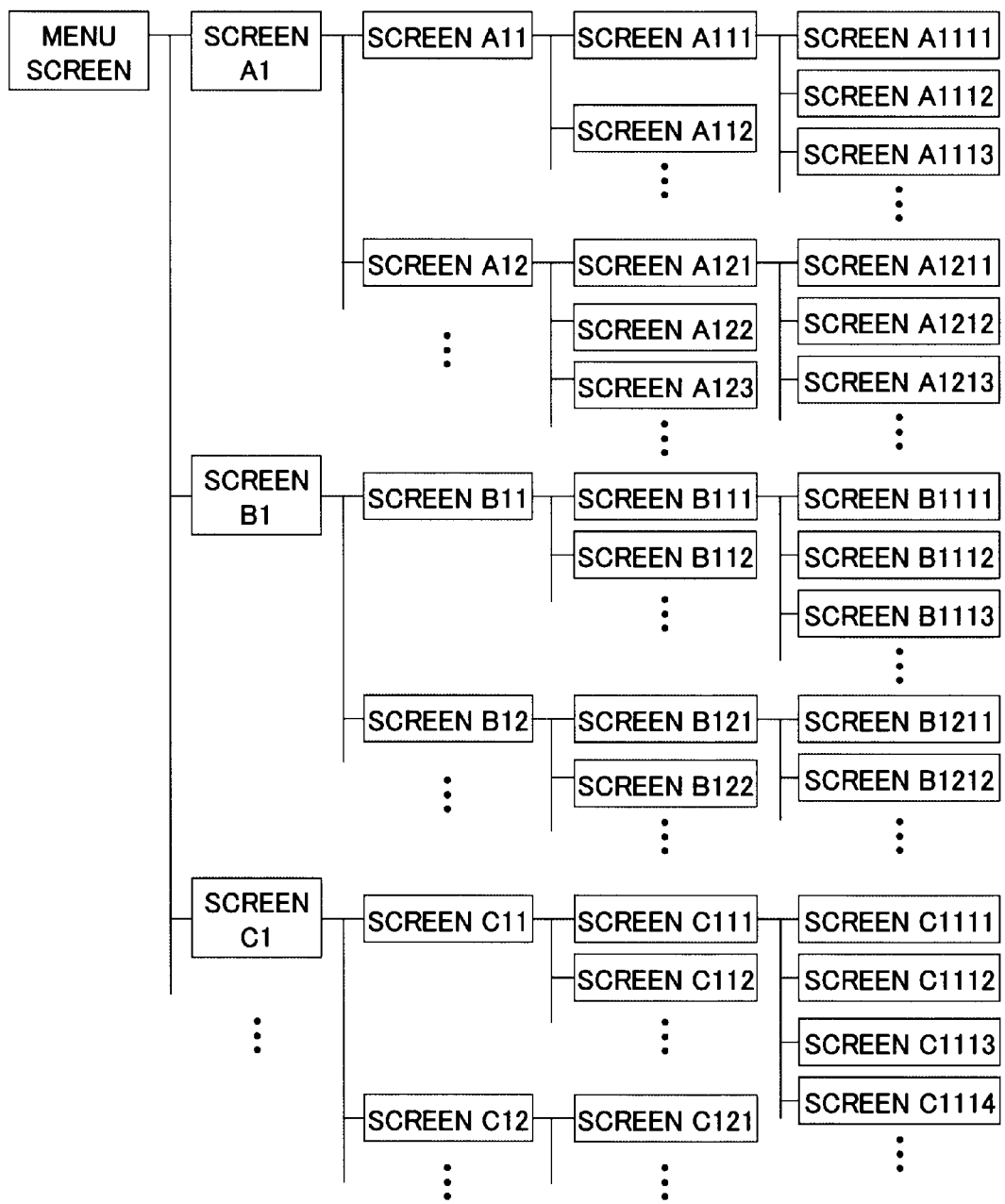
FIG. 4 is a conceptual diagram illustrating the screens sorted in hierarchical layers in the embodiment.

In the screen data storage unit 354, screen data corresponding to various screens including the operation screens, the function setting screens and the HELP screens mentioned earlier, which are brought up on display at the operator operation display unit 210, are stored. As illustrated in the conceptual diagram in FIG. 4, the various screens are sorted into a plurality of groups with the screens in each group organized in hierarchical layers. For instance, as a button displayed in the menu screen in FIG. 4 is depressed, a screen A1, B1 or C1 in the first hierarchical layer is brought up on display. As a button in the screen in the first hierarchical layer, e.g., the screen A1, is depressed, a screen A11, A12 . . . or the like in the second hierarchical layer is brought up on display and, as a button displayed in the screen in the second hierarchical layer, e.g., the screen A11, is depressed, a screen A111, A112, . . . or the like in the third hierarchical layer is brought up on display. Namely, the screen brought up on display is sequentially switched from one to another.

Since a substrate processing apparatus such as the heat treatment apparatus 100 has diverse functions, the number of function setting screens and function description screens (HELP screens) displaying function descriptions that may be brought up on display is extremely large. Each time a new function is added into a substrate processing apparatus with multiple functions of today, a function setting screen and a HELP screen used to select the particular function is to be selected are created, resulting in an ever increasing number of function setting screens. In other words, each time a new function is introduced in a substrate processing apparatus, the number of screens that may be brought up on display at the substrate processing apparatus increases. New function setting screens and HELP screens are sequentially added into existing layers in the relevant screen groups or are added in newly created deeper hierarchical layers in the corresponding screen groups, resulting in an increase in the number of screens in each hierarchical layer and an increase in the number of hierarchical layers.

A problem thus arises in that since the number of screen hierarchical layers is becoming ever larger, it becomes more time-consuming and labor-intensive for the operator to reach the desired setting screen in a deeper hierarchical layer through screen operations. In addition, depending upon how the screens are sorted, a setting screen for a given target may be included in a hierarchical layer in another screen group. Under such circumstances, it is bound to be an extremely complicated and time-consuming process to find the desired setting screen. There is an added concern to be addressed when the operation screens and the setting screens are sorted into separate screen groups in that if it becomes necessary to adjust the setting for a target object while the apparatus is engaged in operation with an operation screen on display after performing setting operations in a setting screen, the operator will have to perform a complicated setting operation by first reverting to the setting screen and sequentially switching through multiple setting screens until the desired setting item for the target object is brought up on display for the setting adjustment.

The operator needs to have certain know-how and experience with regard to the various setting screens and the setting operations performed to select specific settings in order to be able to bring up on display the desired setting screen quickly. In other words, there may be operators who do not know how to locate a specific function or how to locate the corresponding setting item that must be selected in order to set a given function.

Accordingly, the function setting screens and the HELP screens for target objects with regard to which settings can be selected among the components constituting the heat treatment apparatus 100 (e.g., operator interface objects, operation target objects and setting target objects to be detailed later) are individually set in correlation with specific target objects in advance and operation support buttons (e.g., the function setting button 232 and the HELP button 234) are provided so that the function setting screen or the HELP screen set in advance in correlation to a specific target object, which may be an operator interface object operated following a depression of an operation support button or an operation target object or a setting target object specified in a simulation image following the depression of an operation support button, can be brought up on display immediately (setting operation support processing). As a result, the operator is able to bring up on display the desired function setting screen or HELP screen promptly through a simple operation and the setting operation can be easily and conveniently performed.

Data correlating the function setting screens and the HELP screens to specific target objects may be stored in, for instance, the screen data storage unit 354. Namely, in the screen data storage unit 354, an operator interface object setting-related screen data table 352A having stored therein in advance operator interface object setting-related screen information correlating each operator interface object to a specific function setting screen and a specific function description screen (HELP screen), as shown in FIG. 5A, an operation target object setting-related screen data table 352B having stored therein in advance operation target object setting-related screen information correlating each operation target object to a specific function setting screen and a specific function description screen (HELP screen) as shown in FIG. 5B and a setting target object setting-related data table screen 352C having stored therein in advance setting target object setting-related screen information correlating each setting target object to a specific function setting screen and a specific function description screen (HELP screen) as shown in FIG. 5C are held. It is to be noted that the function descriptions displayed in the HELP screens may be stored together with the HELP screens in the screen data storage unit 354 or in a separate HELP data storage unit (not shown) specially installed so as to store the function descriptions each in correlation to a specific HELP screen.

The term "operator interface object" refers to an operation button or the like with which the heat treatment apparatus 100 is operated, for which a specific operation setting can be selected. Such an operator interface object may be, for instance, the operator access button 240 shown in FIG. 1. It is to be noted that an operation button may be a hardware button included in the operation unit 200 as in the embodiment or it may be a button displayed at the operator operation display unit 210.

The term "operation target object" is used to refer to a target object among the components constituting the heat treatment apparatus 100, for which a specific operation setting can be selected. Such operation target objects include, for instance, the carrier transfer 182 and the wafer transfer mechanism 176 shown in FIG. 2. The term "setting target object" is used to refer to a target object among the components constituting the heat treatment apparatus 100, for which a specific type or model number can be selected. Such a setting target object may be, for instance, the wafer boat 130 shown in FIG. 2. It is to be noted that a given component may be both an operation target object and a setting target object. In other words, a component constituting part of the heat treatment apparatus 100, for which a specific type or model number can be selected (setting target object), may also be an operation target object for which a specific operation setting can be selected.

Figure 7:
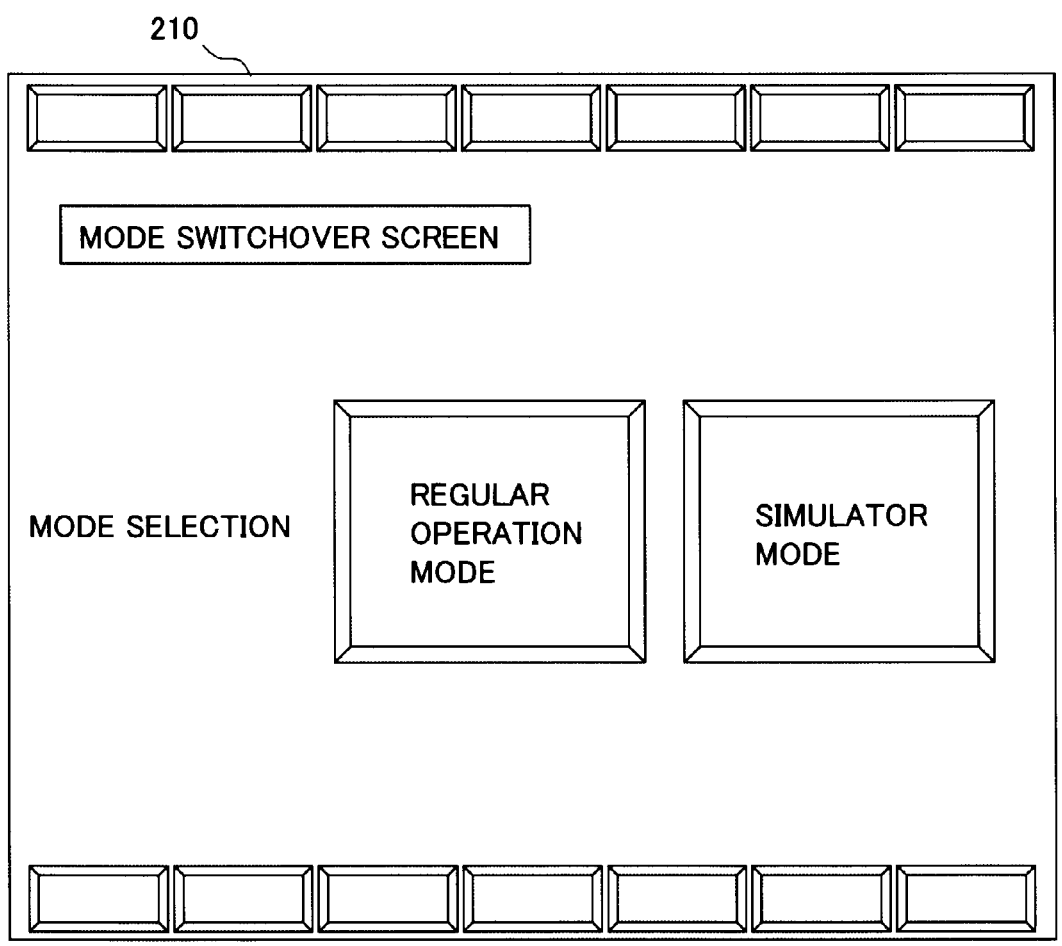
FIG. 7 presents a specific example of a mode switch over screen that may be brought up on display at the operator operation display unit in the embodiment.

The various screens including the function setting screens, the HELP screens and the operation screens described above may be brought up on display at the operator operation display unit 210, as shown in FIG. 6. In FIG. 6, an operation menu screen representing an example of an operation screen, is displayed. In the operation menu screen, a mode switchover button 212 is displayed in addition to a gas button, a temperature button and a processed button. As the mode switchover button 212 is depressed, a screen such as that shown in FIG. 7, with a regular operation mode button to be selected when processing wafers by actually engaging the heat treatment apparatus 100 in operation and a simulator mode button to be selected when engaging the simulator 330 in simulation (e.g., a simulation of the operation of an operation target object or a simulation of setting target object display) and displaying the simulation image at the simulation operation display unit 220 without actually engaging the heat treatment apparatus 100 in operation is brought up on display so as to allow the operator to select either mode.

Figure 8:
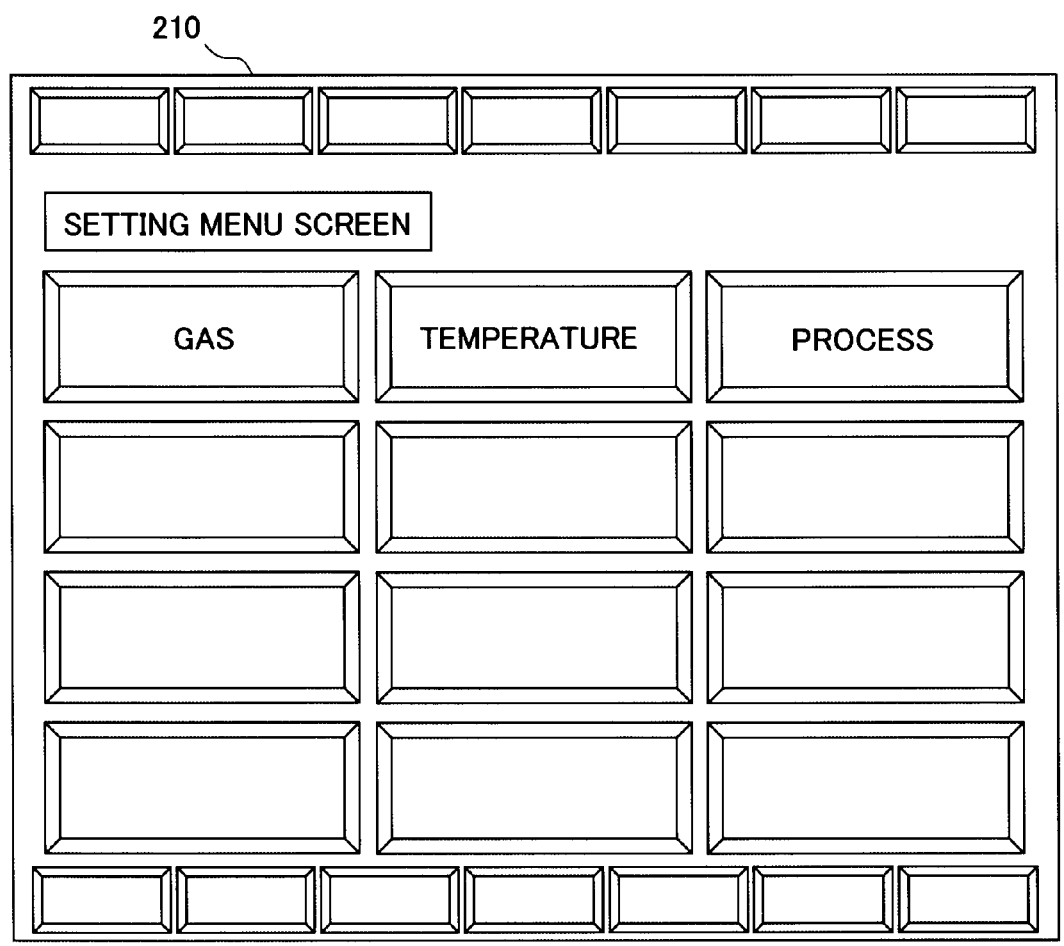
FIG. 8 presents a specific example of a setting menu screen that may be brought up on display at the operator operation display unit in the embodiment.

In addition, a setting button 214 is displayed in the operation menu screen shown in FIG. 6 and as this setting button is depressed, a setting menu screen such as that shown in FIG. 8, is brought up on display at the operator operation display unit 210. As a given button displayed in this setting menu screen is depressed, the function setting screen in the lower layer is brought up on display and the screen operation of depressing a button in the function setting screen to bring up on display the function setting screen in a layer further down in the hierarchical structure is repeatedly performed until the desired function setting screen comes up on display.

Figure 9:
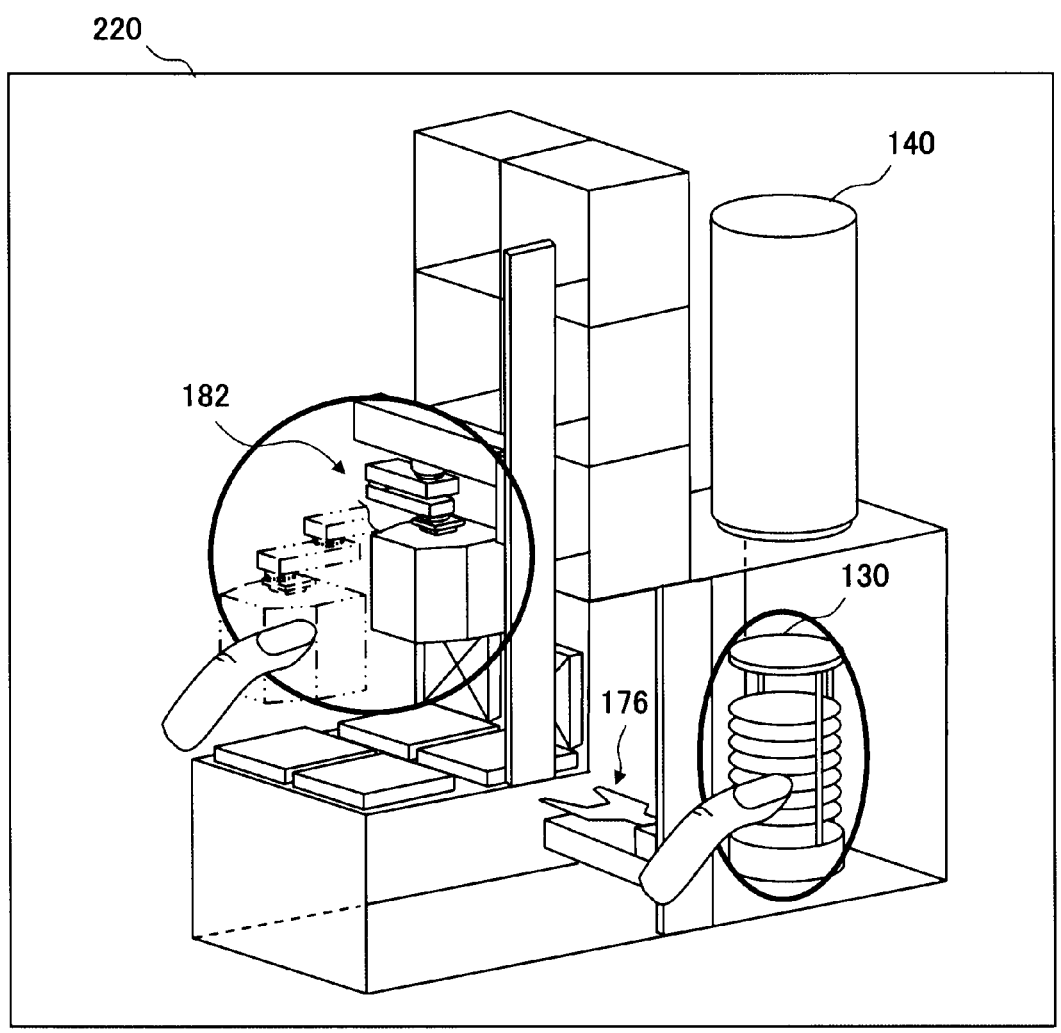
FIG. 9 presents a specific example of a simulation screen that may be brought up on display at the simulation operation display unit in the embodiment.

At the simulation operation display unit 220 in FIG. 6, a simulation image of an operation target object provided by the simulator 330 in response to an operator operation performed via the operation screen (not shown) is displayed as a dynamic image, as shown in FIG. 9 in the simulator mode. In addition, as the operator touches an operation target object a simulated operation of which is underway (e.g., the carrier transfer 182) or a setting target object on simulated display (e.g., a wafer boat 130) so as to specify the particular target object.

(Setting Operation Support Processing)

The setting operation support processing executed in the heat treatment apparatus 100 structured as described above is now described. The setting operation support processing is executed by the control unit 300 based upon a specific program. The setting operation support processing may be executed for an operator interface object such as an operation button, an operation target object for which a simulated operation is underway or a setting target object, a simulation image of which is on display. The three different types of setting operation support processing are now individually explained.

(Operator Interface Object Setting Support Processing)

Figure 10:
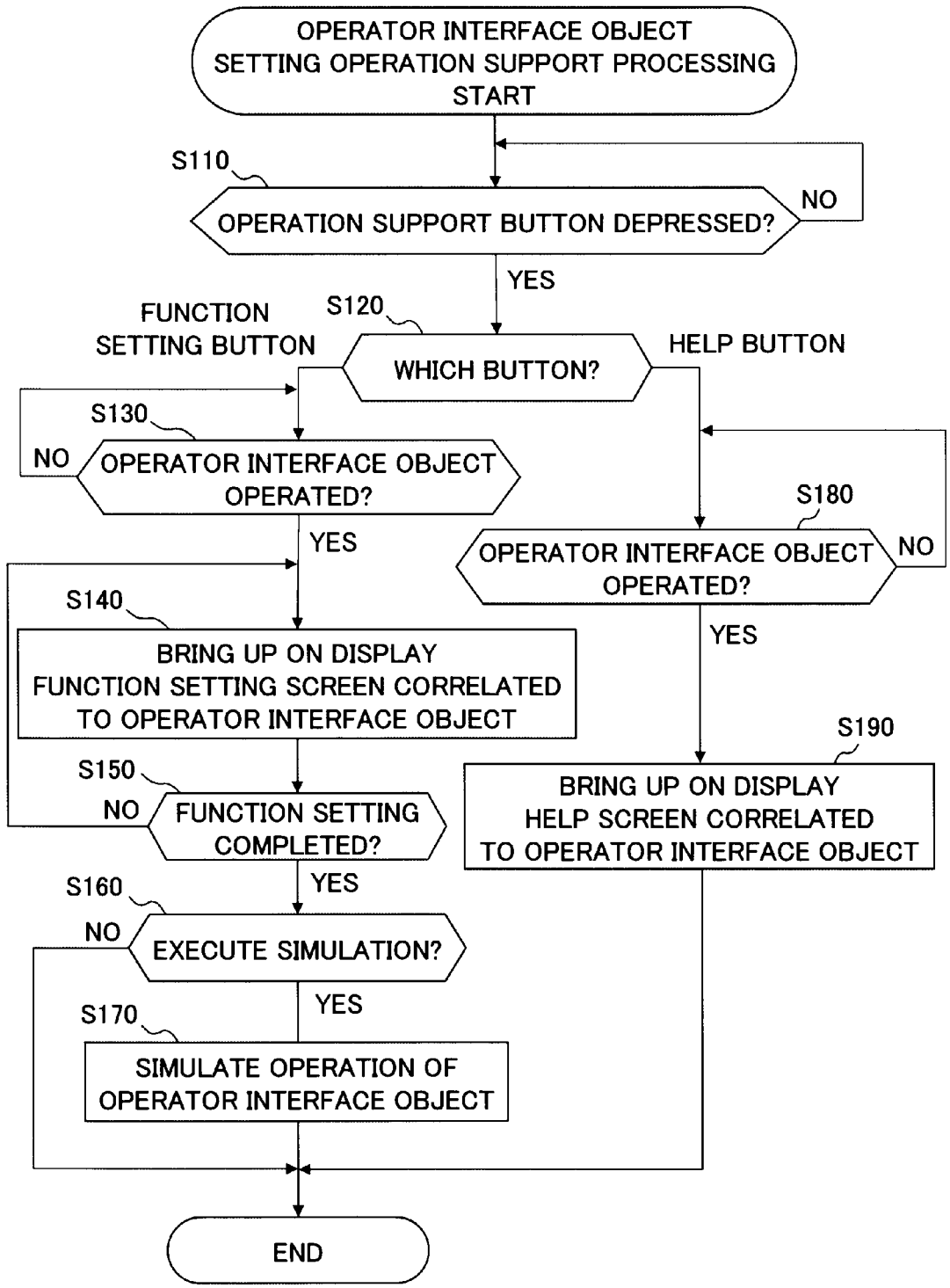
FIG. 10 presents a flowchart of the operator interface object setting operation support processing executed in the embodiment.
Figure 11:
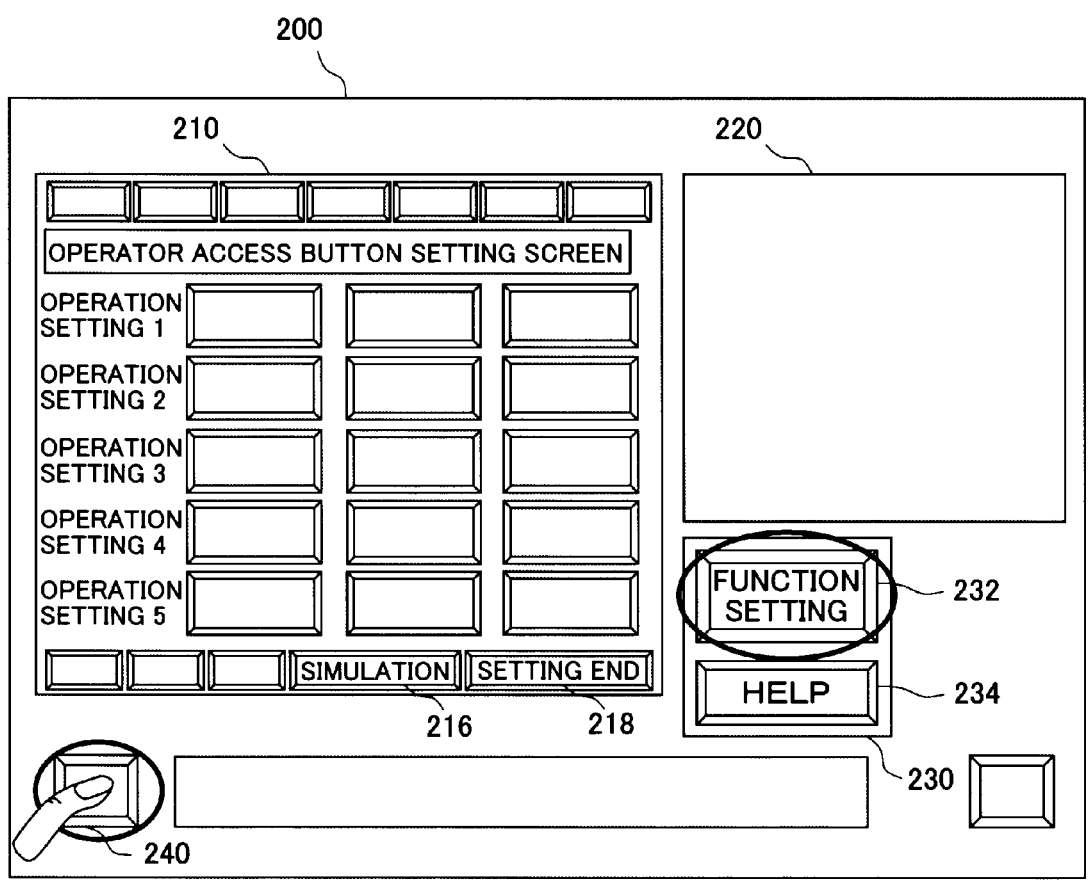
FIG. 11 illustrates an example of an operation that may be performed to display an operator interface object function setting screen.

The operator interface object setting operation support processing is now explained in reference to drawings. FIG. 10 presents a flowchart of a specific example of the operator interface object setting operation support processing. As shown in FIG. 10, a decision is first made in step S110 as to whether or not an operation support button 230 has been depressed. Since the function setting button 232 and the HELP button 234 are both used as operation support buttons 230 as shown in FIG. 11 in the embodiment, a decision is made in step S110 as to whether or not either of these buttons has been depressed. Then, a decision is made in step S120 as to which specific button has been depressed and if it is decided that the function setting button 232 has been depressed, a decision is made in step S130 as to whether or not an operator interface object has been operated. For instance, a decision may be made in step S130 as to whether or not an operation button that qualifies as an operator interface object, disposed at the operation unit 200 (e.g., the operator access button 240 shown in FIG. 11) has been operated or whether or not a button on display in the operation screen, which qualifies as an operator interface object, has been operated.

If it is decided in step S130 that an operator interface object has been operated, the function setting screen correlated to the particular operator interface object is searched from the operator interface object setting-related screen data table 352A such as that shown in FIG. 5A, held in the screen data storage unit 354 and the function setting screen obtained through the search is brought up on display at the operator operation display unit 210 in step S140.

A setting screen such as that shown in FIG. 11 may be brought up on display at the operator operation display unit 210 in step S140. In this setting screen displaying settings for the operator access button 240, a specific function setting (e.g., a setting for manually setting a carrier 102 as mentioned earlier) for the operator access button 240 can be selected by touching the corresponding setting on the screen. In addition, a setting end button 218, which the operator touches upon completing the setting operation to store the particular setting having been selected, a simulation button 216 that the operator touches to simulate the operation at the selected setting and the like are displayed in the setting screen. It is desirable that the setting end button 218, the simulation button 216 and the like, which are also used in other function setting screens, be displayed at positions that remain unchanged in all the function setting screens, e.g., toward the bottom of the screen shown in FIG. 11.

Next, a decision is made in step S150 as to whether or not the setting operation performed in the function setting screen on display at the operator operation display unit 210 has been completed and if it is decided that the setting operation has been completed, the selected setting is stored into the setting data storage unit 353. The setting operation may be judged to have been completed when, for instance, the setting end button 218 displayed in the function setting screen in FIG. 11 is depressed, and the selected setting is then stored.

In step S160, a decision is made as to whether or not to execute a simulation. It may be decided that a simulation is to be executed if the simulation button 218 displayed in the function setting screen in FIG. 11 is depressed. If, on the other hand, another button is selected or another operation is performed without depressing the simulation button 216, it is decided that a simulation is not to be executed and the sequence of the setting operation support processing ends. Subsequently, processing corresponding to the other button that has been depressed or the operation having been performed is executed.

If it is decided in step S160 that a simulation is to be executed, the operation of the operator interface object is simulated in step S170. More specifically, if the heat treatment apparatus is set in the regular operation mode, it is first automatically switched into the simulator mode to execute the simulation and, once the simulation ends, the heat treatment apparatus is switched back into the initial regular operation mode. If, on the other hand, the heat treatment apparatus is already in the simulator mode, the simulation is executed without switching the mode. As the selected operator interface object is operated in the simulator mode, the simulation of the operation of the operator interface object is executed by the simulator 330 based upon the setting data indicating the setting having been selected and, for instance, a dynamic image of the simulation is brought up on display at the simulation operation display unit 220. Once the simulation ends, the sequence of the setting operation support processing also ends.

If it is decided in step S120 that the HELP button 234 has been depressed, a decision is made in step S180 as to whether or not an operator interface object has been operated as in step S130 described earlier. If it is decide d in step S180 that an operator interface object has been operated, the HELP screen correlated to the particular operator interface object is searched from the operator interface object setting-related screen data table 352A such as that shown in FIG. 5A, held in the screen data storage unit 354 and the HELP screen obtained through the search is brought up on display at the operator operation display unit 210 in step S190, before the sequence of the setting operation support processing ends.

The operator interface object setting operation support processing described above enables the operator wishing to select a function setting for the operator interface object to promptly bring up on display the function setting screen for the operator interface object at the operator operation display unit 213 simply by performing an easy and intuitive operation of depressing the function setting button 232 and operating the specific operator interface object. In other words, the need for locating the function setting screen for the operator interface object by repeatedly switching the display from one screen to another starting from the setting menu screen is eliminated. As a result, the procedural labor is greatly reduced and better ease of use is assured.

Figure 12:
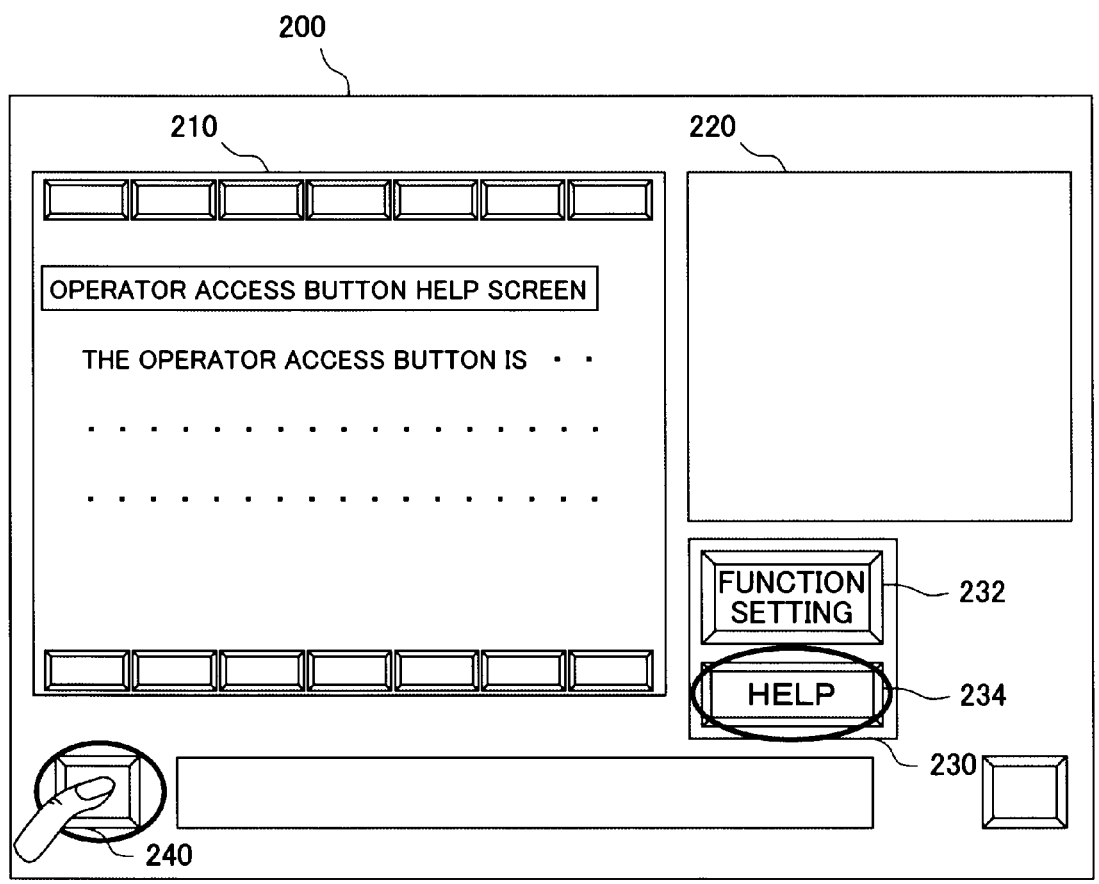
FIG. 12 illustrates an example of an operation that may be performed to display an operator interface object function description screen.
Figure 13:
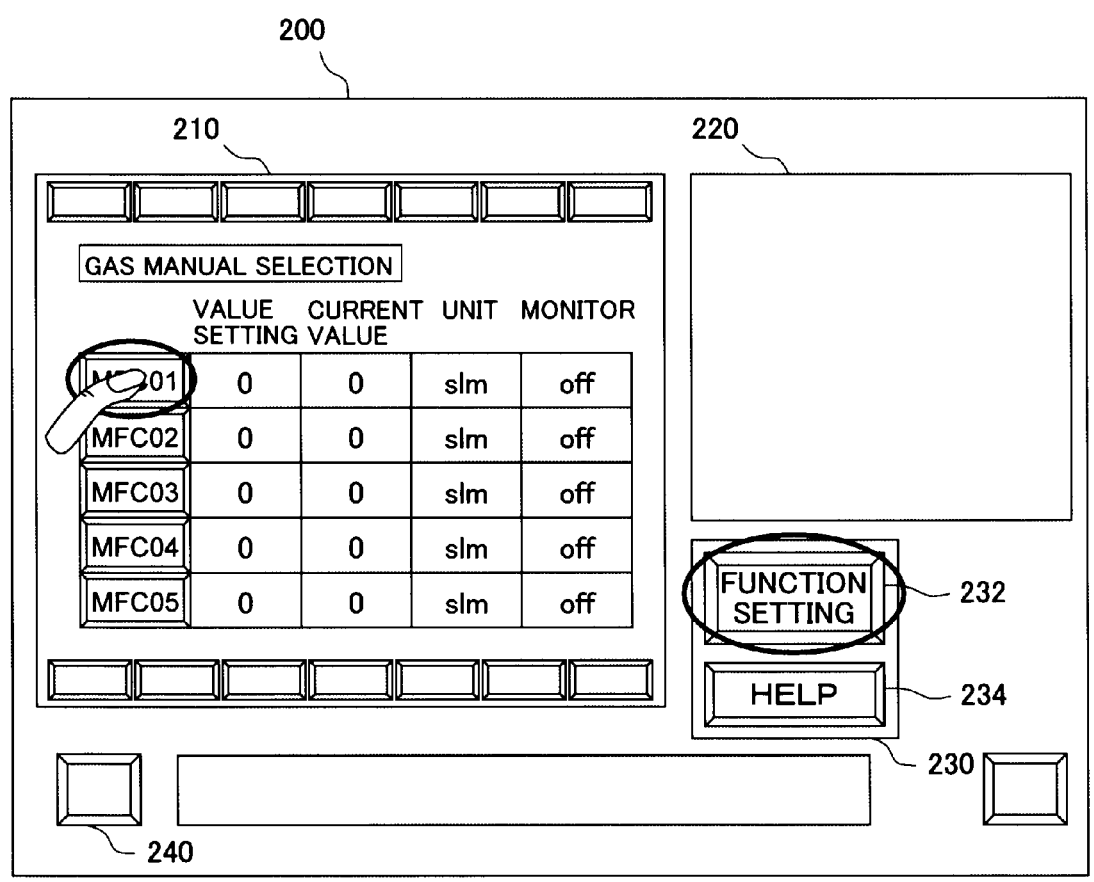
FIG. 13 illustrates another example of an operation that may be performed to display an operator interface object function setting screen.
Figure 14:
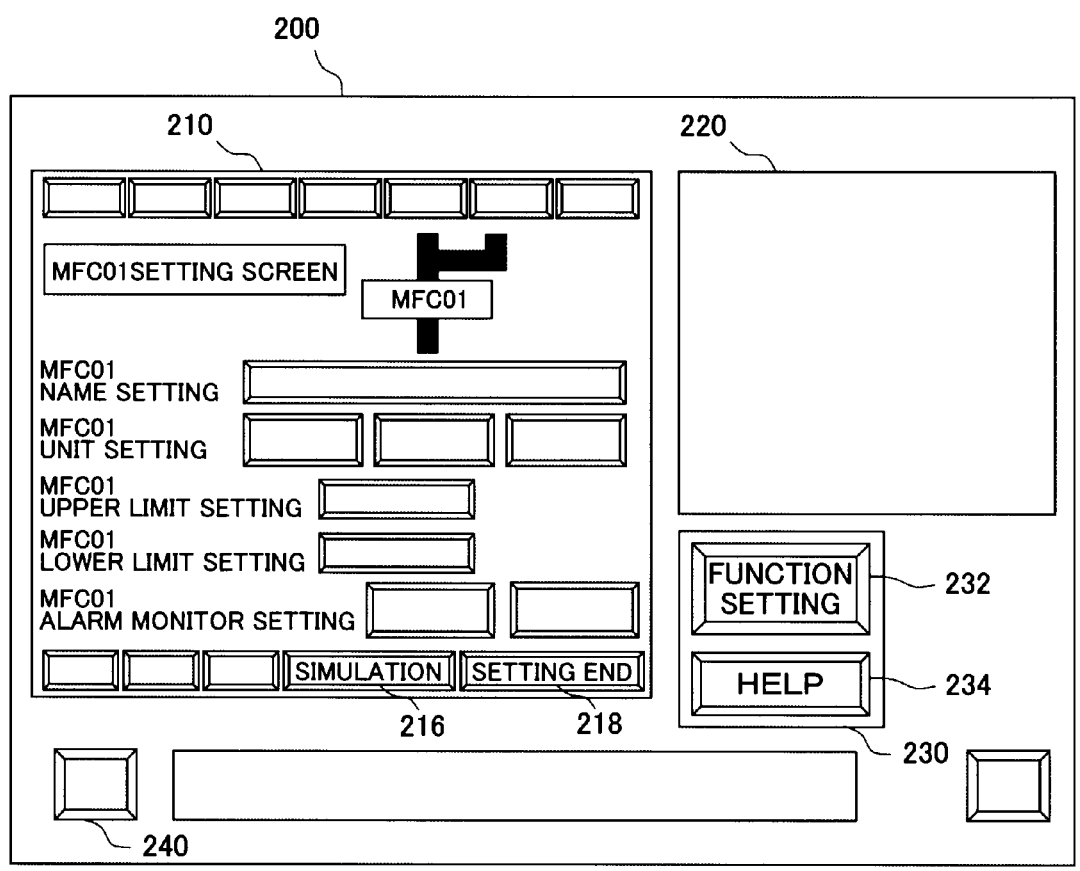
FIG. 14 presents a specific example of an operator interface object function setting screen that may be brought up on display through the operation shown in FIG. 13.

Specific examples of operator interface object function setting operations performed by the operator through the setting operation support processing are now explained in reference to drawings. FIG. 11 illustrates the function setting operation for the operator access button 240 representing an example of an operator interface object, whereas FIG. 12 illustrates the function description display operation performed to display the function description for the operator access button 240. FIGS. 13 and 14 illustrate a function setting operation for an operator interface object constituted with a button displayed in an operation screen.

The operator wishing to select a function setting for, for instance, the operator access button 240 through the setting operation support processing in the embodiment first manually depresses the function setting button 232. The operator then manually depresses the operator access button 240 to immediately bring up the operator access button setting screen on display at the operator operation display unit 210, as shown in FIG. 11, without any actual processing executed via the operator access button 240. The operator is thus able to promptly select a setting for the operator access button.

After adjusting the setting for the operator access button 240, the operator may depress the simulation button 216 and operate the operator access button 240 to bring up his play at simulation operation display unit 220 a dynamic simulation image of the processing to be executed via the operator access button 240 at the adjusted setting.

The operator wishing to bring up the HELP screen for the operator access button 240 first manually depresses the HELP button 234. The operator then manually depresses the operator access button 240 to immediately bring up the operator access button HELP screen on display at the operator operation display unit 210, as shown in FIG. 12, without any actual processing executed via the operator access button 240. The operator is thus able to promptly view the description of the settings and functions of the operator access button 240.

Next, the operation performed to select a function setting for an operator interface object constituted with a button displayed in an operation screen is explained in reference to FIGS. 13 and 14. As the operator manually depresses the function setting button 232 and then depresses the gas button he wishes to select a gas manual selection screen representing an example of an operation screen, in which the gas to be used can be manually selected through a button operation, on display at the operator operation display unit 210, as shown in FIG. 13, a setting screen such as that shown in FIG. 14, in which a function can be selected in conjunction with the particular gas, is brought up on display at the operator operation display unit 210 without actually executing processing for selecting the gas for use. Thus, the function of the gas to be selected in the gas manual selection screen can be set before actually selecting the gas. Since this eliminates the need to locate the gas setting screen by switching to the setting menu screen and allows the operator to select a setting any time he wishes, better ease of use is assured.

The operator interface object setting operation support processing described above simply requires the operator to perform an operation via the operator interface object such as an operation button after depressing the function setting button 232 to immediately and automatically bring up on display the screen related to the settings for the operator interface object at the operator operation display unit 210. As a result, the length of time required for the setting operation can be greatly reduced. After depressing the function setting button 232, the operator simply needs to perform an operation via the operator interface object to promptly bring up on display the screen related to the settings for the operator interface object even if he does not have any know-how or experience with regard to setting operations, e.g., where the desired setting screen is located. Furthermore, since the screen related to the settings for the operator interface object is brought up on display automatically, the function to be set can be located with ease. Since the ultimate target setting screen does not need to be located by sequentially switching through setting screens as in the related art, the setting operation can be performed with greater ease and convenience.

In addition, the operator only needs to perform an extremely simple operation of depressing the HELP button 234 and operate the operator interface object to immediately and automatically bring up on display the HELP screen for that particular operator interface object. As a result, the labor that would be involved in locating the HELP screen is eliminated and the operator is able to perform a setting operation with improved reliability by viewing the description brought up on display.

Furthermore, once the setting operation is performed in the screen on display at the operator operation display unit 210, the simulation of the operation, which would be executed in response to an operation of the operator interface object, can be immediately brought up on display at the simulation operation display unit 220, allowing the operator to promptly verify the operation to be executed at the selected setting. The actual operation can thus be executed with a high level of reliability at the selected setting. In addition, since the need to check the operation executed in response to an operation of the operator interface object by actually engaging the heat treatment apparatus 100 in operation following the setting operation is eliminated, better ease of use is assured.

(Operation Target Object Operation Setting Support Processing)

Figure 15:
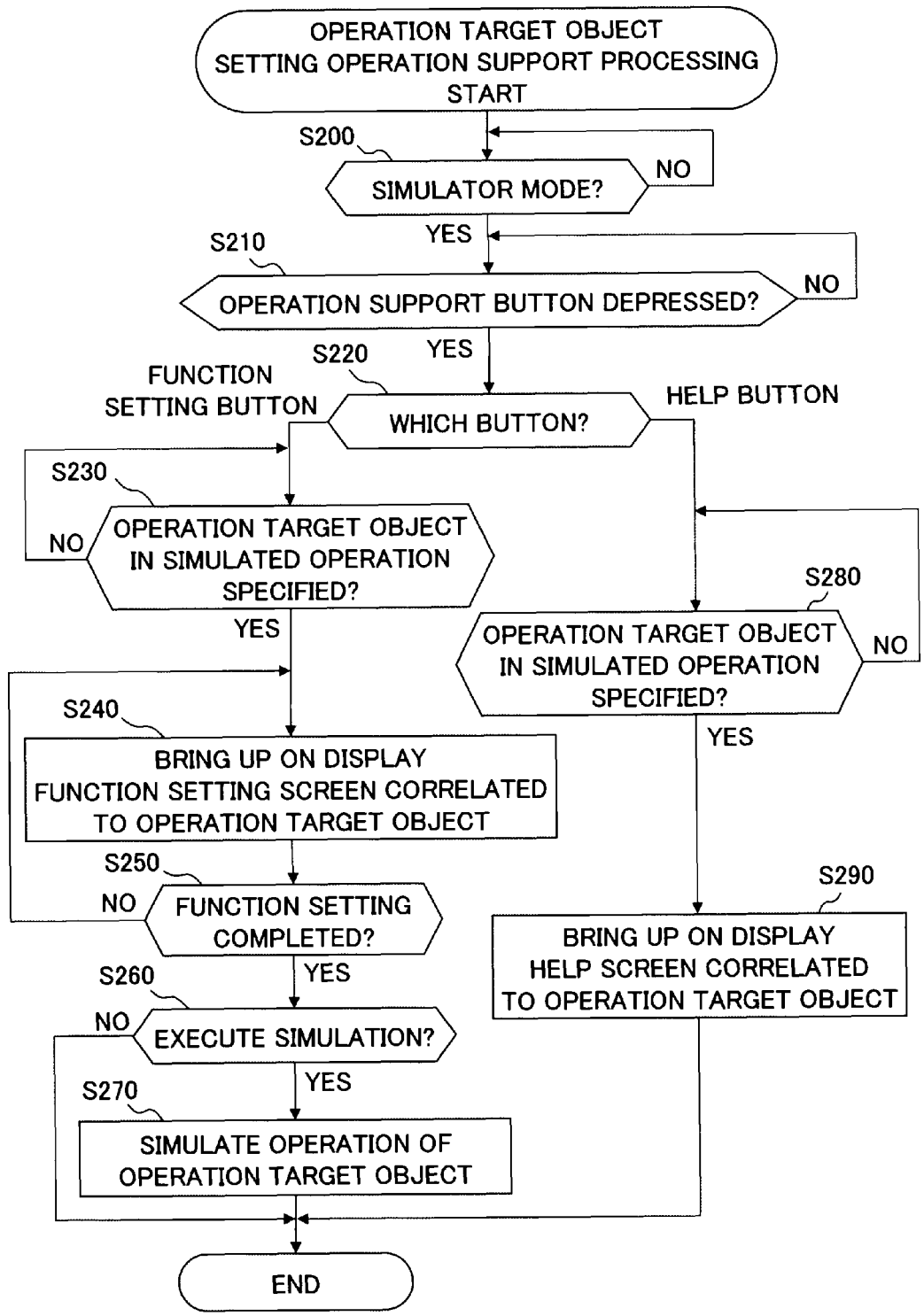
FIG. 15 presents a flowchart of the operation target object setting operation support processing executed in the embodiment.
Figure 16:
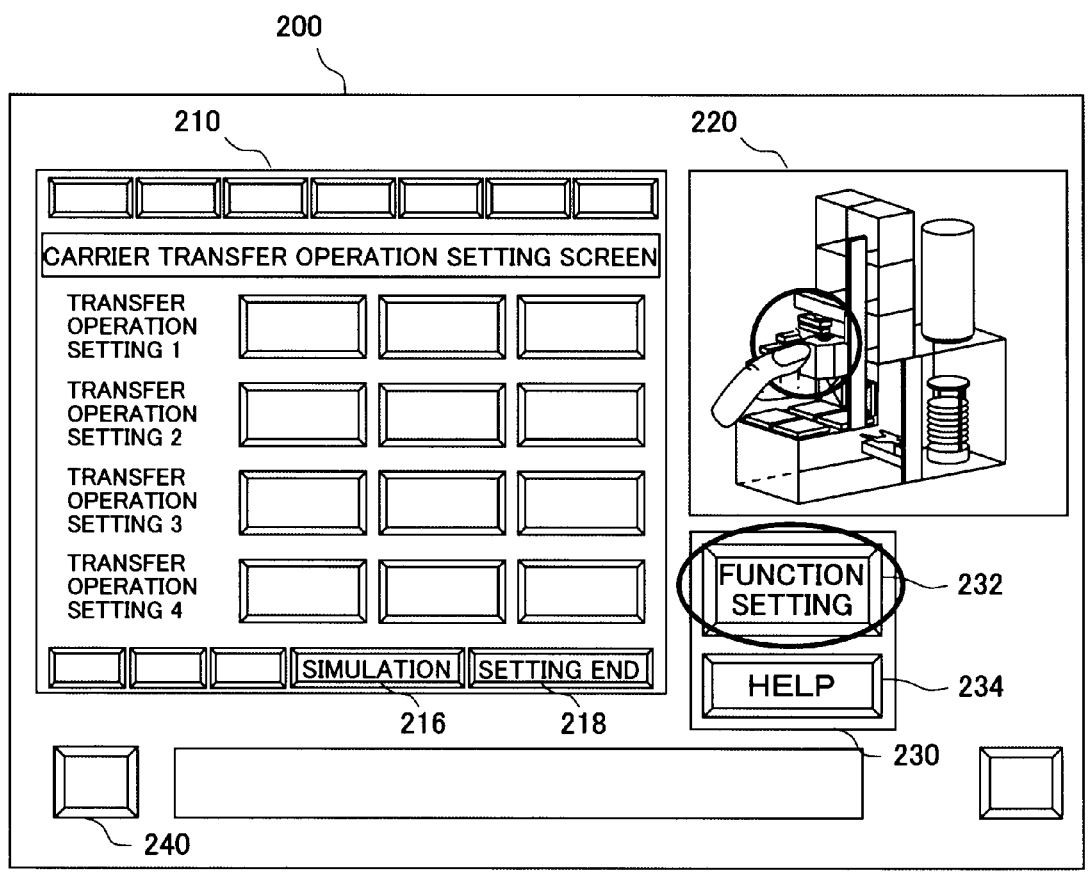
FIG. 16 illustrates an example of an operation that may be performed to display an operation target object function setting screen.

Next, the operation target object operation setting support processing is explained in reference to drawings. FIG. 15 presents a flowchart of a specific example of the operation target object setting operation support processing. In step S200 in FIG. 15, a decision is made as to whether or not the simulator mode is on, as an operation target object can be specified on the screen on display at the simulation operation display unit 220 in the simulator mode. Then, in step S210, a decision is made as to whether or not an operation support button 230 has been depressed. In the embodiment, a decision is made in step S210 by making a decision as to whether or not either of the function setting button 232 and the HELP button 234, both constituting operation support buttons 230, as shown in FIG. 16, has been depressed. Then, in step S220, the specific button that has been depressed is determined and if it is decided that the function setting button 232 has been depressed, a decision is made in step S230 as to whether or not an operation target object for which an operation simulation is underway has been specified.

An operation target object is specified at the simulation operation display unit 220 as explained earlier. In more specific terms, the range of coordinates at the touch panel of the simulation operation display unit 220, matching the display range over which a simulated operation of a specific operation target object is displayed, is designated as a specification range for the particular operation target object and such specification ranges set for various operation target objects are stored into the image data storage unit 352 in advance. Then, as the specification range of an operation target object, the simulated operation of which is on display at the simulation operation display unit 220, is manually touched, as shown in FIG. 16, the operation target object is judged to have been specified. It is to be noted that the operation target object may be specified in a manner other than that described above.

Upon judging in step S230 that an operation target object, for which a simulated operation is underway, has been specified, the function setting screen correlated to the operation target object is searched from the operation target object setting-related screen data table 352B in FIG. 5B in the screen data storage unit 354 and the function setting screen obtained through the search is brought up on display at the operator operation display unit 210 in step S240. The function setting screen brought up on display at the operator operation display unit 210 may be, for instance, the setting screen shown in FIG. 16. FIG. 16 shows a carrier transfer operation setting screen in which a specific setting for the transfer operation to be executed by the carrier transfer 182 to transfer a carrier 102 can be selected.

Next, a decision is made in step S250 as to whether or not the setting operation performed in the function setting screen on display at the operator operation display unit 210 has been completed and if it is decided that the setting operation has been completed, the selected setting is stored into the setting data storage unit 353. The setting operation may be judged to have been completed when, for instance, the setting end button 218 displayed in the function setting screen in FIG. 16 is depressed, and the selected setting is then stored.

In step S260, a decision is made as to whether or not to execute a simulation. It may be decided that a simulation is to be executed if the simulation button 218 displayed in the function setting screen in FIG. 16 is depressed. If, on the other hand, another button is selected or another operation is performed without depressing the simulation button 216, it is decided that a simulation is not to be executed and the sequence of the setting operation support processing ends. Subsequently, processing corresponding to the other button that has been depressed or the operation having been performed is executed.

If it is decided in step S260 that a simulation is to be executed, the operation of the operation target object is simulated in step S270. It is to be noted that since the heat treatment apparatus is already in the simulator mode, the simulation can be executed without having to switch modes. In the simulator mode, a simulation of the operation of the operation target object is executed by the simulator 330 based upon the setting data indicating the setting having been selected and, for instance, a dynamic image of the simulation is brought up on display at the simulation operation display unit 220. Once the simulation ends, the sequence of the setting operation support processing also ends.

If it is decided in step S220 that the HELP button 234 has been depressed, a decision is made in step S280 as to whether or not an operation target object for which a simulated operation is underway has been specified, as in step S230 described earlier. If it is decided in step S280 that an operation target object has been specified, the HELP screen correlated to the particular target operation setting is searched from the operation target object setting-related screen data table 352B such as that shown in FIG. 5B, held in the screen data storage unit 354, and the HELP screen obtained through the search is brought up on display at the operator operation display unit 210 in step S290, before the sequence of the setting operation support processing ends.

The operation target object setting operation support processing described above enables the operator wishing to select a function setting for the operation of the operation target object to first simulate the operation of the operation target object and display a dynamic image of the simulated operation of the operation target object at the simulation operation display unit 220. The operator only needs to perform a simple and intuitive operation of depressing the function setting button 232 and specifying the operation target object for which the simulated operation is underway by touching it on the screen at the simulation operation display unit 220 to immediately bring up on display the function setting screen for the operation target object at the operator operation display unit 210. In other words, the need for locating the function setting screen for the particular operation target object by switching the displays many times from one screen to another starting with the setting menu screen is eliminated. As a result, the procedural labor is greatly reduced and better ease of use is assured. In addition, since the selected setting can be verified through the simulation, the need to engage the heat treatment apparatus 100 in actual operation in order to verify the setting is eliminated altogether.

As a specific example of an operation target object function setting operation performed by the operator through the setting operation support processing achieved in the embodiment is now explained in reference to drawings. FIG. 16 illustrates the function setting operation for the carrier transfer operation to be executed by the carrier transfer 182 representing an example of an operation target object, whereas FIG. 17 illustrates the function description display operation performed to display the function description for the carrier transfer 182.

The operator wishing to select a function setting for the carrier transfer operation to be executed by the carrier transfer 182 in conjunction with the setting operation support processing described above first manually depresses the function setting button 232 and then manually touches the carrier transfer 182, the simulated operation of which is on display at the simulation operation display unit 220, as shown in FIG. 16 while the simulation of the carrier transfer operation for transferring a carrier 102 by the carrier transfer 182, i.e., the operation target object, is underway, so as to immediately bring up on display the carrier transfer operation setting screen at the operator operation display unit 210. The operator is thus able to select a specific carrier transfer operation to be executed by the carrier transfer 182 immediately.

Upon adjusting the setting for the carrier transfer operation, the operator may depress the simulation button 216 to bring up on display at the simulation operation display unit 220 a dynamic image of simulated transfer operation that would be executed by the carrier transfer 182 at the adjusted setting.

Figure 17:
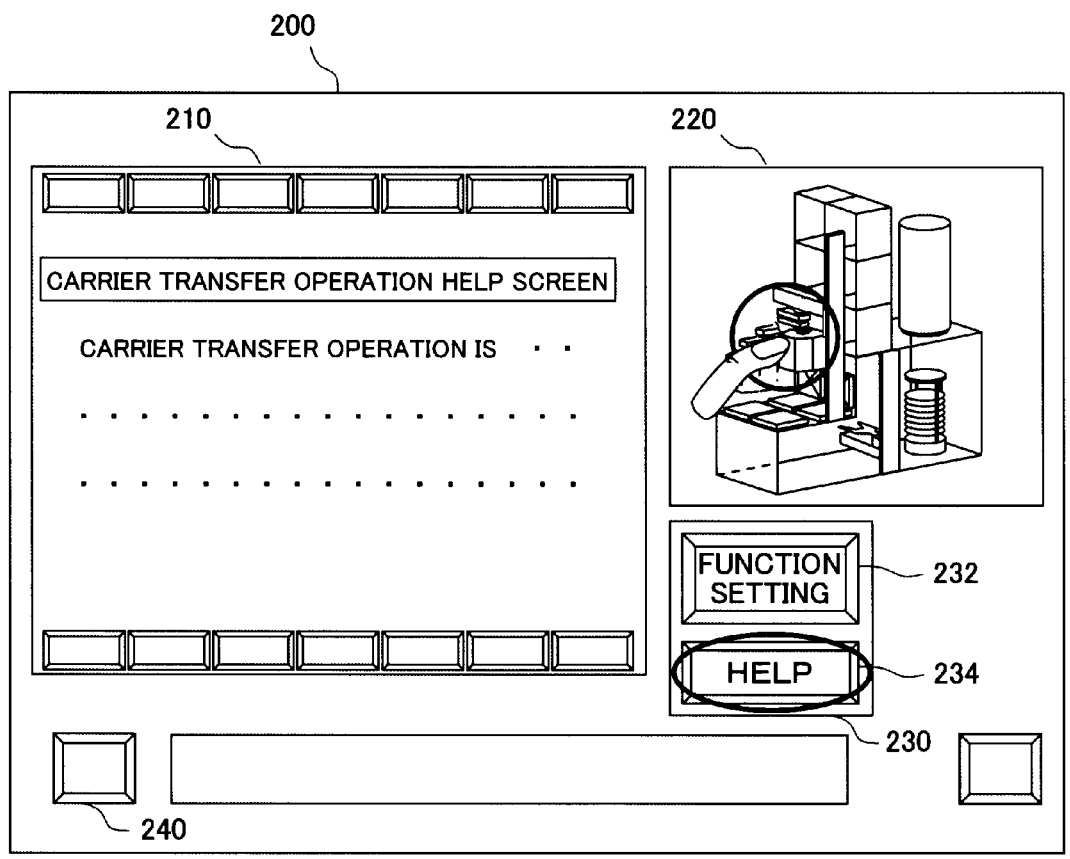
FIG. 17 illustrates an example of an operation that may be performed to display an operation target object function description screen.

The operator wishing to display the HELP screen for the carrier transfer operation by the carrier transfer 182 only needs to first depress the HELP button 234 and then manually touch the carrier transfer 182, the simulated operation of which is on display at the simulation operation display unit 220, while the simulation of the carrier transfer operation fro transferring a carrier 102 by the carrier transfer 182 is underway, as shown in FIG. 17, to promptly bring up on display the carrier transfer operation HELP screen at the operation operator operation display unit 210. Thus, the operator is able to immediately verify the description of the settings and the functions that may be selected for the carrier transfer operation without having to exit the operation in the simulation mode.

The operation target object setting operation support processing described above simply requires the operator to follow a visually intuitive procedure in which he depresses the function setting button 232 and specifies the operation target object, a simulated operation of which is on display at the simulation operation display unit 220, by touching the operation target object on the screen to immediately and automatically bring up on display the screen related to the settings for the operation target object at the operator operation display unit 210. As a result, the length of time required for the setting operation can be greatly reduced. The operator simply needs to depress the function setting button 232 while the simulated operation of the operation target object is underway to promptly bring up on display the screen related to the settings for the operator interface object even if he does not have any know-how or experience with regard to setting operations, e.g., even if he does not know where the desired setting screen is located. Furthermore, since the screen related to the settings for the operator interface object is brought up on display automatically, the function to be set can be located with ease.

Since the ultimate target setting screen does not need to be located by sequentially switching through setting screens as in the related art, the setting operation can be performed with greater ease and convenience.

In addition, the operator simply needs to perform a very simple and visually intuitive operation of depressing the HELP button 234 and then specifying the operation target object, the simulated operation of which is underway, by touching the operation target object on the screen at the simulation operation display unit 220 to immediately and automatically bring up on display the operation target object function description screen at the operator operation display unit 210. As a result, the labor that would be involved in locating the function description screen is eliminated and the operator is able to perform a setting operation with improved reliability by viewing the description brought up on display.

Furthermore, once the setting operation is performed in the screen on display at the operator operation display unit 210, the simulation of the operation to be executed by the operation target object can be immediately brought up on display at the simulation operation display unit 220, allowing the operator to promptly verify the operation to be executed at the selected setting. The actual operation by the operation target object can thus be executed with a high level of reliability at the selected setting. In addition, since the need to check the operation of the operation target object by actually engaging the heat treatment apparatus in operation following the setting operation is eliminated, better ease of use is assured.

(Setting Target Object Setting Operation Support Processing)

Figure 18:
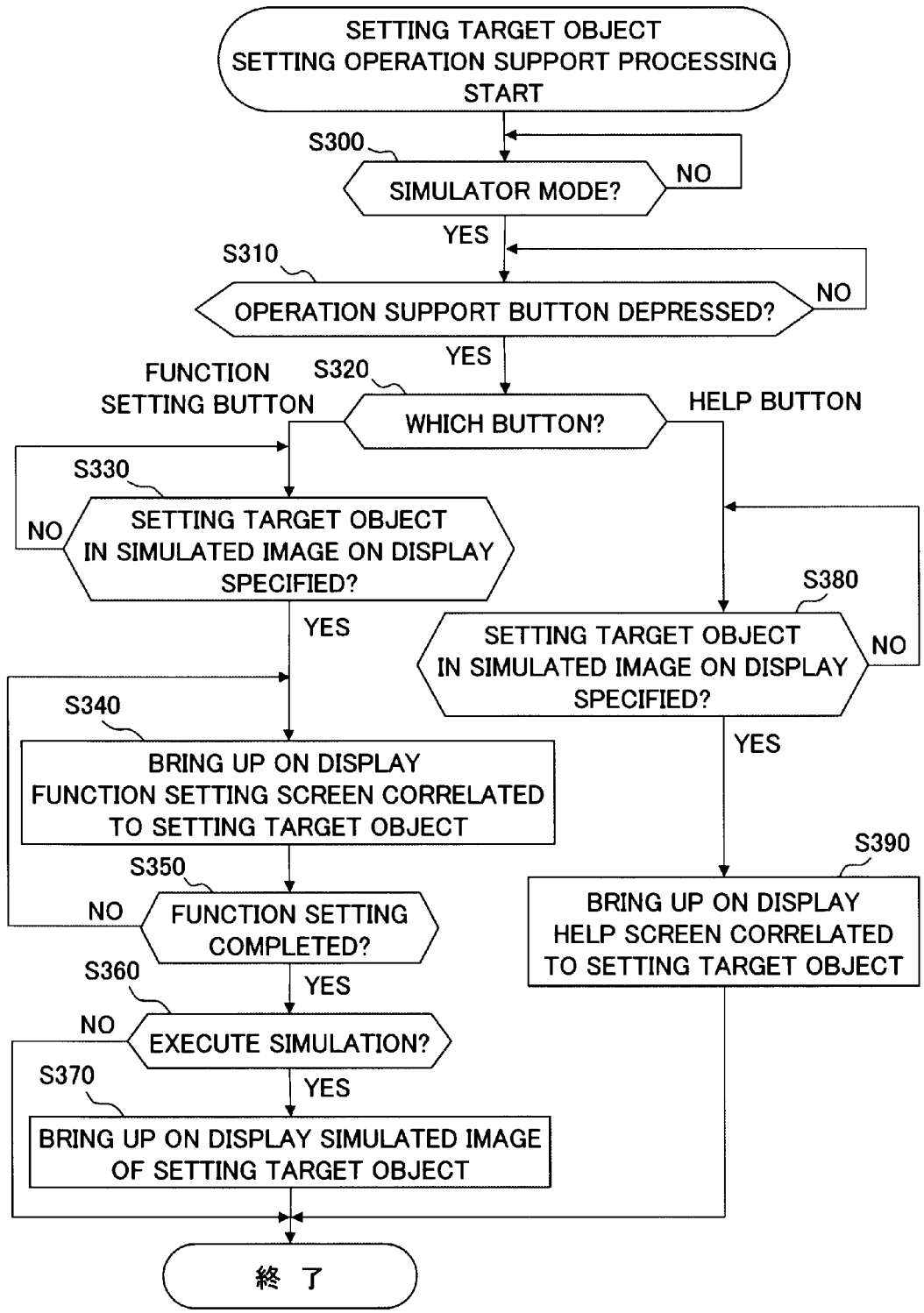
FIG. 18 presents a flowchart of the setting target object setting operation support processing executed in the embodiment.
Figure 19:
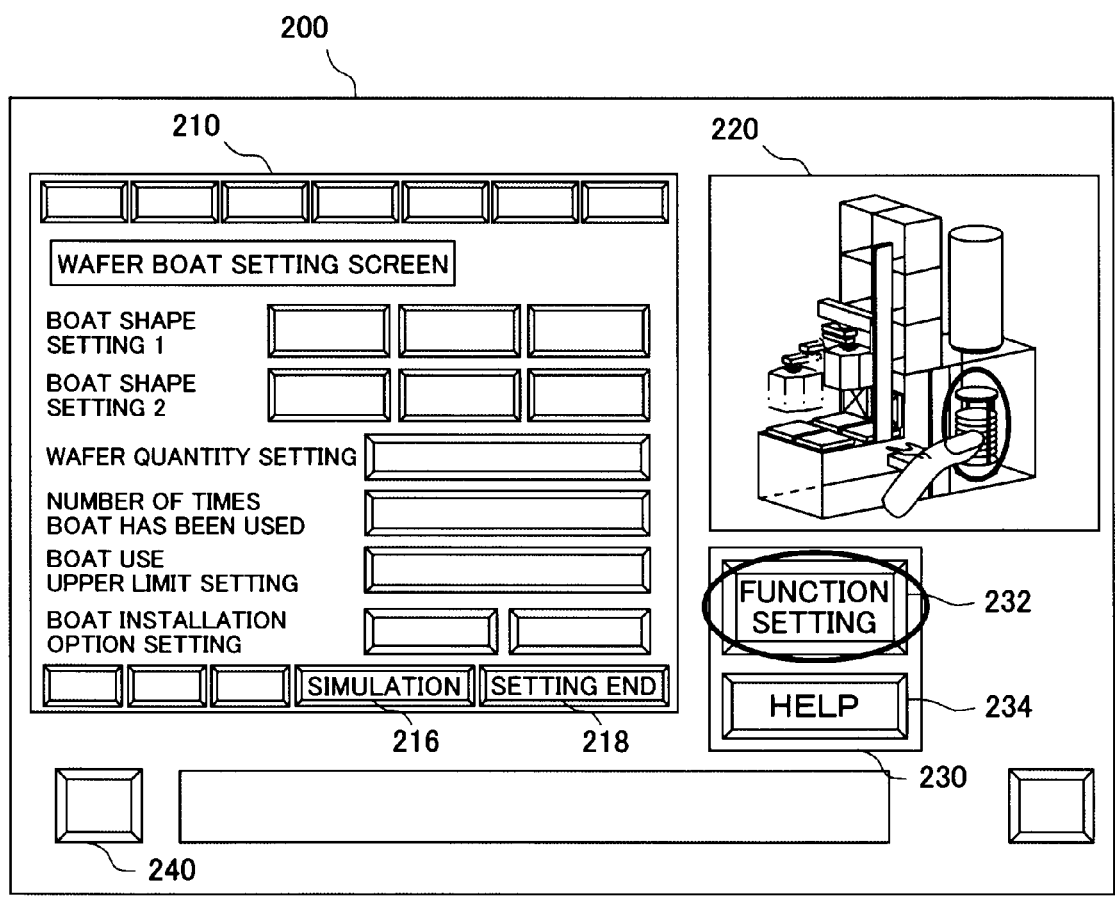
FIG. 19 illustrates an example of an operation that may be performed to display a setting target object function setting screen.

Next, the setting target object setting operation support processing is explained in reference to drawings. FIG. 18 presents a flowchart of a specific example of the setting target object setting operation support processing. In step S300 in FIG. 18, a decision is made as to whether or not the simulator mode is on, as a setting target object can be specified on the screen on display at the simulation operation display unit 220 in the simulator mode. Then, in step S310, a decision is made as to whether or not an operation support button 230 has been depressed. In the embodiment, a decision is made in step S310 by making a decision as to whether or not either the function setting button 232 or the HELP button 234, both constituting operation support buttons 230, as shown in FIG. 19, has been depressed. Then, in step S320, the specific button that has been depressed is determined and if it is decided that the function setting button 232 has been depressed, a decision is made in step S330 as to whether or not a setting target object, a simulation image of which is on display at the simulation operation display unit 220, has been specified.

A setting target object is specified at the simulation operation display unit 220 as explained earlier. In more specific terms, the range of coordinates at the touch panel of the simulation operation display unit 220, matching the display range over which a simulation image of a specific setting target object is displayed, is designated as the specification range for the particular setting target object and such specification ranges set for various setting target objects are stored into the image data storage unit 352 in advance. Then, as the specification range of a setting target object, the simulation image of which is on display at the simulation operation display unit 220, as shown in FIG. 19, is manually touched, the setting target object is judged to have been specified. It is to be noted that the setting target object may be specified in a manner other than that described above.

Upon judging in step S330 that a setting target object for which the simulation image is on display, has been specified, the function setting screen correlated to the setting target object is searched from the operation target object setting-related screen data table 352C in FIG. 5C in the screen data storage unit 354 and the function setting screen obtained through the search is brought up on display at the operator operation display unit 210 in step S340. The function setting screen brought up on display at the operator operation display unit 210 may be, for instance, the setting screen shown in FIG. 19. The setting screen shown in FIG. 19 is a wafer boat setting screen in which a setting for the wafer boat 130 can be selected.

Next, a decision is made in step S350 as to whether or not the setting operation performed via the function setting screen on display at the operator operation display unit 210 has been completed and if it is decided that the setting operation has been completed, the selected setting is stored into the setting data storage unit 353. The setting operation may be judged to have been completed when, for instance, the setting end button 218 displayed in the function setting screen in FIG. 19 is depressed, and the selected setting is then stored.

In step S360, a decision is made as to whether or not to execute a simulation. It may be decided that a simulation is to be executed if the simulation button 218 displayed in the function setting screen in FIG. 19 is depressed. If, on the other hand, another button is selected or another operation is performed without depressing the simulation button 216, it is decided that a simulation is not to be executed and the sequence of the setting operation support processing ends. Subsequently, processing corresponding to the other button that has been depressed or the operation having been performed is executed.

If it is decided in step S360 that a simulation is to be executed, a simulation display of the setting target object is brought up in step S370. It is to be noted that since the heat treatment apparatus is already in the simulator mode, the simulation can be executed without having to switch modes. In this step, a simulation image of the setting target object is brought up on display at the simulation operation display unit 220 following a setting change with respect to the setting target object, i.e., after switching the setting target object size, shape or the like. Once the simulation display ends, the sequence of the setting operation support processing also ends.

If it is decided in step S320 that the HELP button 234 has been depressed, a decision is made in step S380 as in step S330 described earlier as to whether or not a setting target object, a simulation image of which is on display, has been specified. If it is decided in step S380 that a setting target object has been specified, the HELP screen correlated to the particular operator interface object is searched from the setting target object setting-related screen data table 352C such as that shown in FIG. 5C, held in the screen data storage unit 354, and the HELP screen obtained through the search is brought up on display at the operator operation display unit 310 in step S390, before the sequence of the setting operation support processing ends.

The setting target object setting operation support processing described above enables the operator wishing to select a setting for a setting target object to first bring up on display a simulation image of the setting target object at the simulation operation display unit 220. The operator then simply performs a simple and intuitive operation of depressing the function setting button 232 and specifying the setting target object, the simulation image of which is on display by touching it on the screen at the simulation operation display unit 220, in order to immediately bring up on display the function setting screen for the particular setting target object at the operator operation display unit 210. In other words, the need for locating the function setting screen for the particular setting target object by switching through many display screens from one to another starting with the setting menu screen is eliminated. As a result, the procedural labor is greatly reduced and better ease of use is assured. In addition, through the simulation, the selected setting can be verified and thus, the heat treatment apparatus 100 can be engaged in operation at the optimal setting with a high level of reliability.

A specific example of a function setting operation performed by the operator for a setting target object through the setting operation support processing achieved in the embodiment is now explained in reference to drawings. FIG. 19 illustrates an operation performed to select a setting for a setting target object, e.g., the wafer boat 130, whereas FIG. 20 illustrates an operation performed to bring up on display the function description for the wafer boat 130.

The operator wishing to enter a setting indicating a wafer boat 130 with a different model number to replace the current wafer boat 130 simply needs to manually depress the function setting button 232 and then specify the wafer boat 130 on display at the simulation operation display unit 220 as shown in FIG. 19 by touching it on the screen while the simulation image of the current wafer boat 130 is on display at the simulation operation display unit 220 in order to immediately bring up a wafer boat setting screen on display at the operator operation display unit 210. Once the wafer boat setting screen is up on display, the operator is immediately able to select the necessary setting with regard to the wafer boat 130.

After selecting the setting for the wafer boat 130 with the different model number, the operator may depress the simulation button 216 to bring up on display a simulation image of the wafer boat 130 corresponding to the new setting at the simulation operation display unit 220.

Figure 20:
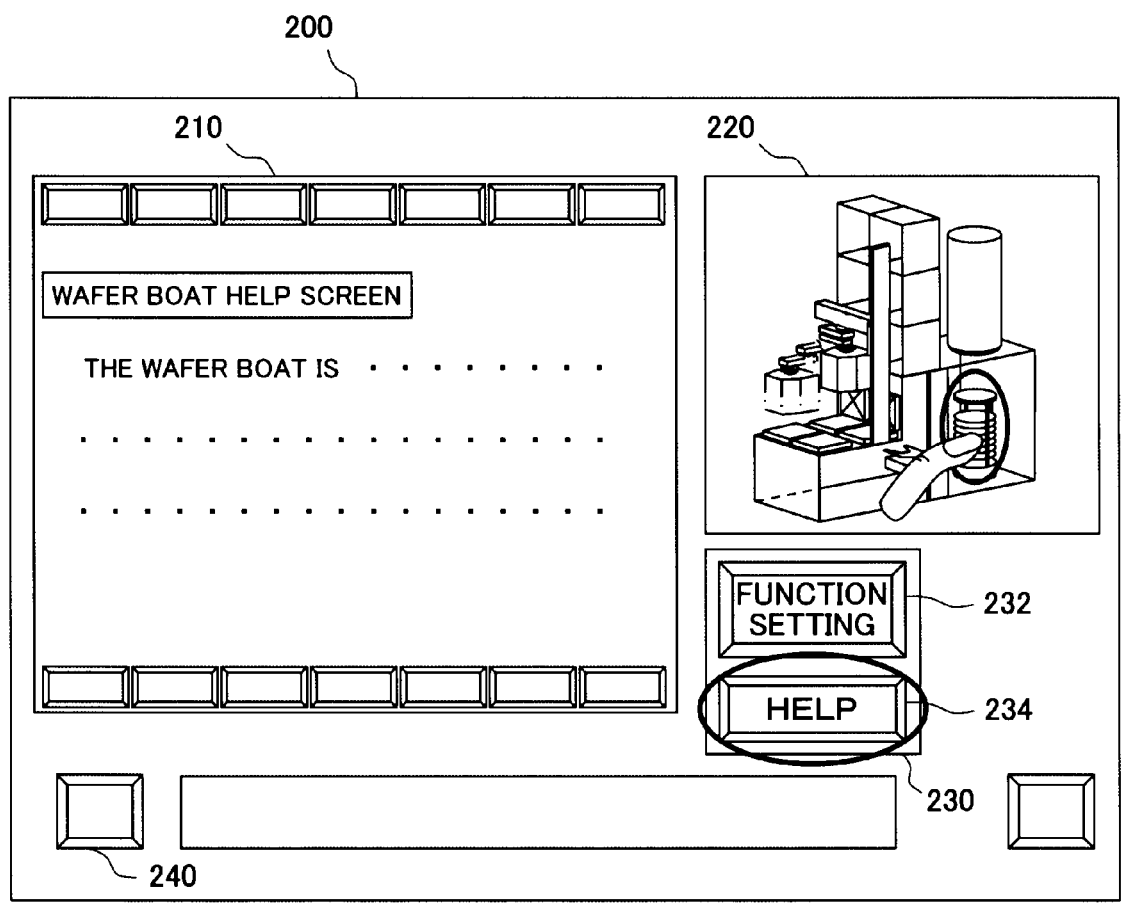
FIG. 20 illustrates an example of an operation that may be performed to display a setting target object function description screen.

In addition, the operator may bring up on display the HELP screen for the wafer boat 130 simply by manually depressing the HELP button 234 and then touching the wafer boat 130 on display at the simulation operation display unit 220 as shown in FIG. 20. Since the wafer boat HELP screen is brought up on display at once at the operation operator display unit 210 in response to this simple, intuitive operation, the operator is able to view the description of the wafer boat setting and functions immediately without having to exit the simulation mode.

The setting target object setting operation support processing described above simply requires the operator to follow a visually intuitive procedure in which he depresses the function setting button 232 and specifies the setting target object, a simulation image of which is on display at the simulation operation display unit 220, by touching the setting target object on the screen to immediately and automatically bring up on display the screen related to the settings for the setting target object at the operator operation display unit 210. As a result, the length of time required for the setting operation can be greatly reduced. While the simulation image of the target object is on display, the operator simply needs to depress the function setting button 232 to promptly bring up on display at the operation display unit the screen related to the settings for the target object even if he does not have any know-how or experience with regard to setting operations, e.g., even if he does not know where the desired setting screen is located. Furthermore, since the screen related to the settings for the setting target object is brought up on display automatically, the function to be set can be located with ease. Since the ultimate target setting screen does not need to be located by sequentially switching through setting screens as in the related art, the setting operation can be performed with greater ease and convenience.

In addition, the operator only needs to perform an extremely simple and visually intuitive operational procedure of depressing the HELP button 234 and specifying the setting target object, a simulation image of which is on display at the simulation operation display unit 220, by touching the setting target object on the screen, to immediately and automatically bring up the function description screen for the setting target object at the operator operation display unit 210. Since the need for an extensive search for the function description screen is eliminated and the setting operation can be performed by checking the description brought up on display, the reliability of the setting operation is improved.

Furthermore, once the setting operation is performed in the screen on display at the operator operation display unit 210, a simulation image of the target object can be immediately brought up on display at the simulation operation display unit 220, enabling the operator to quickly confirm the setting target object for which the setting has been selected. Thus, the correct target object can be set reliably.

It is to be noted that the setting screen for a specific target object (an operator interface object, an operation target object or a setting target object) may be brought up on display through the setting operation support processing achieved in the embodiment by operating the operator interface object or specifying the operation target object or the setting target object while holding down an operation support button 230 instead of first depressing an operation support button 230 and then operating the operator interface object or specifying the operation target object or the setting target object. In other words, an operation support button 230 should be judged to have been depressed in step S110 in FIG. 10, step S210 in FIG. 15 and step S310 in FIG. 18 in either case.

Figure 21:
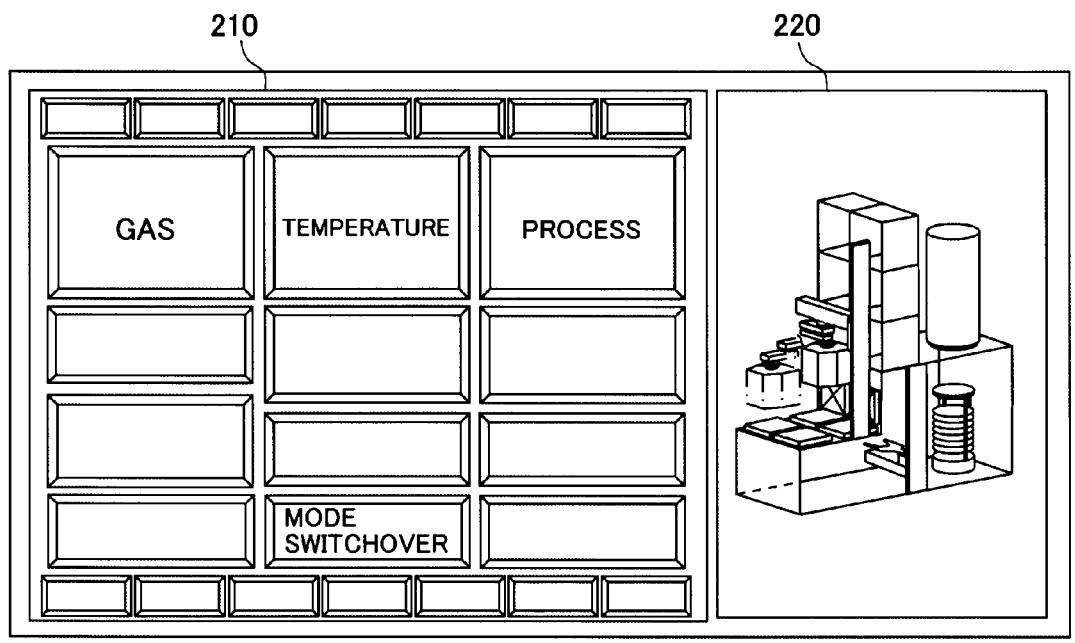
FIG. 21 presents another structural example that may be adopted in the operation display unit in the embodiment.

In addition, while an explanation is given above in reference to the embodiment on an example in which the operator operation display unit 210 and the simulation operation display unit 220 are constituted with separate operation panels, the present invention is not limited to this example and the operation display units may be constituted with a single operation panel, as shown in FIG. 21.

In addition, while the operation support buttons 230 (the function setting button 232 and the HELP button 234) are provided as hardware buttons in the embodiment described above, the present invention is not limited to this example and these operation support buttons 230 may be buttons displayed on the screen at an operation panel. In such a case, the operation support buttons 230 may be displayed at an operation panel independent of those constituting the operator operation display unit 210 and the simulation operation display unit 220, or the operation support buttons 230 may be displayed in a single operation panel shared with the operator operation display unit 210 and a simulation operation display unit 220, as shown in FIG. 22.

Figure 22:
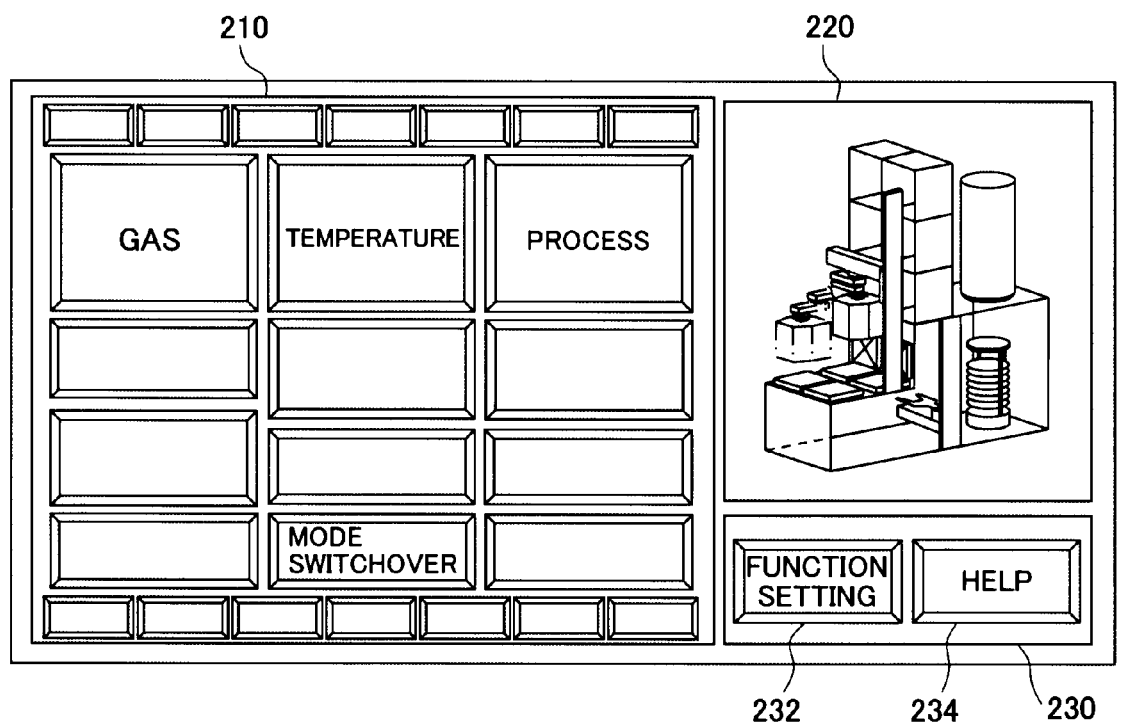
FIG. 22 presents another structural example that may be adopted in the operation unit in the embodiment.

If the heat treatment apparatus 100 is connected to a host computer or a data processing apparatus such as an advance group controller (AGC), the operation support buttons 230 may be displayed together with the operator operation display 210 and the simulation operation display 220, at the display device of the host computer or the computer constituting the data processing apparatus, as shown in FIG. 22, so as to execute the setting operation support processing at the host computer or the data processing apparatus. Under such circumstances, the control unit of the host computer or the data processing apparatus should assume a structure similar to that shown in the block diagram in FIG. 3.

It will be obvious that the present invention may be carried out by providing a medium such as a storage medium having stored therein a software program for fulfilling the functions of the embodiment to a system or an apparatus and thus enabling a computer (a CPU or an MPU) of the system or the apparatus to read out and execute the program stored in the medium such as a storage medium.

In such a case, the program itself, read out from the medium such as a storage medium, embodies the functions of the embodiment described above and the medium such as a storage medium having the program stored therein embodies the present invention. The medium such as a storage medium through which the program is provided may be, for instance, a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, magnetic tape, a nonvolatile memory card, or a ROM. Alternatively, such a program may be distributed via a network.

It is to be noted that the scope of the present invention includes an application in which an OS or the like operating on a computer executes the actual processing in part or in whole in response to the instructions in the program read out by the computer and the functions of the embodiment are achieved through the processing thus executed, as well as an application in which the functions of the embodiment are achieved as the computer executes the program it has read out.

The scope of the present invention further includes an application in which the program read out from the medium such as a storage medium is first written into a memory in a function expansion board loaded in the computer or a function expansion unit connected to the computer, a CPU or the like in the function expansion board or the function expansion unit executes the actual processing in part or in whole in response to the instructions in the program and the functions of the embodiment described above are achieved through the processing.

While the invention has been particularly shown and described with respect to a preferred embodiment thereof by referring to the attached drawings, the present invention is not limited to this example and it will be understood by those skilled in the art that various changes in form and detail may be made therein without departing from the spirit, scope and teaching of the invention.

While an explanation is given above in reference to the embodiment in which the substrate processing apparatus adopting the present invention is the heat treatment apparatus 100, the present invention is not limited to this example and it may be adopted equally effectively in any of various substrate processing apparatuses including etching apparatuses and film forming apparatuses.

What is claimed is:

1. A setting operation support device for a substrate processing apparatus, which supports a setting operation performed to select a setting in said substrate processing apparatus, the setting operation support device comprising:
    an operation button via which said substrate processing apparatus is operated;
    a touch-panel type operation display unit configured to display at least a screen related to settings for said operation button;
    a setting storage unit in which contents of a setting selected in said screen related to the settings for said operator interface object are stored;
    a setting support button that includes at least a function setting button via which a depression of said operation button switches an operation of said operation button to an operation for displaying said screen related to the settings for said operation button;
    a screen storage unit in which operation button setting-related screen information indicating a predetermined correlation between said operation button and said screen related to the settings for said operation button is stored;

a control unit that, in response to a depression of said operation button following a depression of said function setting button, engages said operation display unit to display said setting screen correlated to said operation button searched from said screen storage unit; and a simulator configured to execute a simulation of an operation target object engaged in operation, wherein said operation display unit is configured to display a simulation image of said simulation, and while said simulation image is displayed, said operation display unit is configured to detect a touch operation on said simulation image specifying said operation target object that is being simulated.

2. The setting operation support device for a substrate processing apparatus according to claim 1, wherein:

said operation button is an operation button displayed at said operation display unit or an operation button provided independently of said operation display unit;

said setting support button is a button displayed at said operation display unit or a button provided independently of said operation display unit; and said screen related to the settings for said operation button is a function setting screen.

3. The setting operation support device for a substrate processing apparatus according to claim 1, wherein:

said setting support button includes said function setting button and a function description button;

operation button setting-related screen information indicating a predetermined correlation of a specific function setting screen and a specific function description screen to said operation button is stored in said screen storage unit; and as an operation is performed via said operation button following a depression of said function setting button, said control unit searches for said function setting screen correlated to said operation button at said screen storage unit and engages said operation display unit to display said function setting screen resulting from the search, whereas as an operation is performed via said operation button following a depression of said function description button, said control unit searches for said function description screen correlated to said operation button at said screen storage unit and engages said operation display unit to display on display said function description screen resulting from the search.

4. The setting operation support device for a substrate processing apparatus according to claim 1, wherein:

said simulator executes said simulation for said operation target object engaged in operation as said operation button is operated, and following a setting operation performed in a screen brought up on display at said operation display unit, said control unit stores contents of a selected setting into said setting storage unit, then engages said simulator in execution of a simulation corresponding to the setting contents stored in said setting storage unit for said operation target object engaged in operation, in response to the operation of said operation button, and brings up a simulation image on display at said operation display unit.

5. A setting operation support device for a substrate processing apparatus, which supports a setting operation performed to select a setting for said substrate processing apparatus, the setting operation support device comprising:

an operation target object constituting part of said substrate processing apparatus for which an operation setting can be selected;

a simulator that executes a simulation of an operation of said operation target object;

a touch-panel type operation display unit configured to display at least a screen related to operation settings for said operation target object and a dynamic image of the simulation of said operation target object;

a setting storage unit in which contents of a setting selected in said screen related to the operation settings for said operation target object are stored;

a setting support button that includes a function setting button via which a touch operation at said operation target object on display at said operation display unit switches an operation of said operation target object to an operation for displaying said screen related to the settings for said operation target object;

a screen storage unit in which operation target object setting-related screen information indicating a predetermined correlation between said operation target object and said screen related to the operation settings for said operation target object is stored; and a control unit that searches for said screen correlated to said operation target object at said screen storage unit and engages said operation display unit to display said screen resulting from the search as said operation target object for which simulation execution is underway is specified through a touch operation at said operation display unit following a depression of said function setting button, while the dynamic simulation image of said operation target object is on display at said operation display unit.

6. The setting operation support device for a substrate processing apparatus according to claim 5, wherein:

said setting support button is a button displayed at said operation display unit or a button provided independently of said operation display unit; and said screen related to the operation settings for said operation target object is a function setting screen related to operations of said operation target object.

7. The setting operation support device for a substrate processing apparatus according to claim 5, wherein:

said setting support button includes said function setting button and a function description button;

operation target object setting-related screen information indicating a predetermined correlation of a specific function setting screen and a specific function description screen to said operation target object is stored in said screen storage unit; and as said operation target object for which the simulation execution is underway is specified following a depression of said function setting button while an image of the simulated operation of said operation target object is on display at said operation display unit, said control unit searches for said function setting screen correlated to said operation target object at said screen storage unit and engages said operation display unit to display said function setting screen resulting from the search, whereas as said operation target object for which the simulation execution is underway is specified following a depression of said function description button while the image of the simulated operation of said operation target object is on display at said operation display unit, said control unit searches for said function description screen correlated to said operation target object at said screen storage unit and engages said operation display unit in display said function description screen resulting from the search.

8. The setting operation support device for a substrate processing apparatus according to claim 5, wherein:
following a setting operation performed in said screen related to the operation settings for said operation target object, said control unit stores contents of a selected setting into said setting storage unit, then engages said simulator in execution of a simulation corresponding to the setting contents stored in said setting storage unit for said operation target object and engages said operation display unit to display a simulation image.

9. A setting operation support device for a substrate processing apparatus, which supports a setting operation performed to select a setting for a substrate processing apparatus, the setting operation support device comprising:
a setting target object constituting part of said substrate processing apparatus, a setting of which can be selected;
a simulator that executes a simulation display for said setting target object;
a touch-panel type operation display unit configured to display at least a screen related to settings for said setting target object and a simulation image of said setting target object provided through the simulation;
a setting support button that includes a function setting button via which a touch operation at said setting target object on display at said operation display unit switches an operation of said setting target object to an operation for displaying said screen related to the settings for said setting target object;
a screen storage unit in which setting target object setting-related screen information indicating a predetermined correlation between said setting target object and said screen related to settings for said setting target object is stored; and
a control unit that searches for said screen correlated to said setting target object at said screen storage unit and engages said operation display unit to display said screen resulting from the search as said setting target object on display is specified through a touch operation at said operation display unit following a depression of said function setting button, while the simulation image of said setting target object is on display at said operation display unit.

10. The setting operation support device for a substrate processing apparatus according to claim 9, wherein:
said setting support button is a button displayed at said operation display unit or a button provided independently of said operation display unit; and
said screen related to the settings for said setting target object is a function setting screen related to said setting target object.

11. The setting operation support device for a substrate processing apparatus according to claim 9, wherein:
said setting support button includes said function setting button and a function description button;
setting target object setting-related screen information indicating predetermined correlation of a specific function setting screen and a specific function description screen to said setting target object is stored in said screen storage unit; and
as said setting target object the simulated image of which is on display is specified following a depression of said function setting button while the simulation image of said setting target object is on display at said operation display unit, said control unit searches for said function setting screen correlated to said setting target object at said screen storage unit and engages said operation display unit to display said function setting screen resulting from the search, whereas, as said setting target object the simulated image of which is on display is specified following a depression of said function description button while the simulation image of said setting target object is on display at said operation display unit, said control unit searches for said function description screen correlated to said setting target object at said screen storage unit and engages said operation display unit to display said function description screen resulting from the search.

12. The setting operation support device for a substrate processing apparatus according to claim 9, further comprising:
a setting storage unit in which contents of a setting selected in said screen related to the settings for said setting target object are stored, wherein:
following a setting operation performed in said screen related to the settings for said setting target object, said control unit stores setting contents into said setting storage unit, then engages said simulator in execution of a simulation corresponding to the setting contents stored in said setting storage unit for said setting target object and engages said operation display unit to display an image of the simulation.

13. A setting operation support method adopted in a substrate processing apparatus to support a setting operation performed for said substrate processing apparatus, the setting operation support method comprising:
executing, by a simulator, a simulation of an operation of an operation target object, which constitutes part of said substrate processing apparatus for which an operation setting can be selected;
displaying, by a touch-panel type operation display unit, at least a screen related to operation settings for said operation target object and a dynamic image of the simulation of said operation target object;
storing, by a setting storage unit, contents of a setting selected in said screen related to the operation settings for said operation target object;
storing, by a screen storage unit, operation target object setting-related screen information indicating a predetermined correlation between said operation target object and said screen related to the operation settings for said operation target object;
switching, via a touch operation at said operation target object via a function setting button, an operation of said operation target object to an operation for displaying said screen related to the settings for said operation target object; and
searching, by a control unit, for said screen correlated to said operation target object at said screen storage unit and engaging said operation display unit to display said screen resulting from the searching as said operation target object for which simulation execution is underway is specified through a touch operation at said operation display unit following a depression of said function setting button, while the displaying displays the dynamic simulation image of said operation target object at said operation display unit.

14. A tangible non-transitory computer-readable storage medium having stored therein a program enabling a computer to execute steps of a setting operation support method for supporting a setting operation performed to select a setting for a substrate processing apparatus, the setting operation support method comprising:
- executing, by a simulator, a simulation display for a setting target object, which constitutes part of said substrate processing apparatus, a setting of which can be selected;
- displaying, by a touch-panel type operation display unit, at least a screen related to settings for said setting target object and a simulation image of said setting target object provided through the simulation;
- storing, by a screen storage unit, setting target object setting-related screen information indicating a predetermined correlation between said setting target object and said screen related to the settings for said setting target object;
- switching, via a touch operation at said setting target object via a function setting button, an operation of said setting target object to an operation for displaying said screen related to the settings for said setting target object; and
- searching, by a control unit, for said screen correlated to said setting target object at said screen storage unit and engaging said operation display unit to display said screen resulting from the searching as said setting target object on display is specified through a touch operation at said operation display unit following a depression of said function setting button, while the displaying displays the simulation image of said setting target object at said operation display unit.

15. The setting operation support device for a substrate processing apparatus according to claim 5, wherein:
- a plurality of operation target objects are displayed on the operation display unit when the dynamic simulation image is on display at the operation display unit, and
- one of the plurality of operation target objects is specified on the image as the operation target object.

* * * * *